United States Patent
Hovden et al.

(10) Patent No.: US 12,211,150 B2
(45) Date of Patent: Jan. 28, 2025

(54) SYSTEM AND METHOD OF OBJECT DETECTION AND INTERACTIVE 3D MODELS

(71) Applicant: Matterport, Inc., Sunnyvale, CA (US)

(72) Inventors: Gunnar Hovden, Sunnyvale, CA (US); Azwad Sabik, Sunnyvale, CA (US)

(73) Assignee: Matterport, Inc., Sunnyvale, CA (US)

( * ) Notice: Subject to any disclaimer, the term of this patent is extended or adjusted under 35 U.S.C. 154(b) by 63 days.

(21) Appl. No.: 18/182,247

(22) Filed: Mar. 10, 2023

(65) Prior Publication Data
US 2023/0290072 A1 Sep. 14, 2023

Related U.S. Application Data

(60) Provisional application No. 63/269,854, filed on Mar. 24, 2022, provisional application No. 63/269,168, filed on Mar. 10, 2022.

(51) Int. Cl.
*G06T 7/70* (2017.01)
*G06T 19/00* (2011.01)
(Continued)

(52) U.S. Cl.
CPC ............. *G06T 19/003* (2013.01); *G06T 7/70* (2017.01); *G06V 10/764* (2022.01); *G06V 10/82* (2022.01);
(Continued)

(58) Field of Classification Search
CPC ........ G06V 10/764; G06V 10/82; G06T 7/70; G06T 19/003; G06T 2207/10028;
(Continued)

(56) References Cited

U.S. PATENT DOCUMENTS

| 10,382,739 B1* | 8/2019 | Rusu ...................... G06V 20/20 |
| 2018/0143756 A1* | 5/2018 | Mildrew ................. G06T 17/05 |

(Continued)

OTHER PUBLICATIONS

International Application No. PCT/US2023064192, International Search Report and the Written Opinion, dated Jun. 29, 2023, 12 pages.

(Continued)

*Primary Examiner* — Jacinta M Crawford
(74) *Attorney, Agent, or Firm* — Ahmann Kloke LLP

(57) ABSTRACT

A system comprising: processors and memory containing instructions to control processors to: receive images representing an interior of a physical environment, identify, using neural network for object recognition, an object in an image, the object is associated with a location relative to the physical environment, identify, using neural network for object recognition, another object in another image, determine if objects in the images are located near or at a similar location based on location information associated with the objects, if the objects are located near or at a similar location, then objects are an instance of a single object, store similar location associated with the single object, display an interactive walkthrough visualization of a 3D model of the physical environment including the single object, receive request regarding object location through the interactive walkthrough visualization, and provide the similar location of the single object for display in the interactive walkthrough visualization.

19 Claims, 23 Drawing Sheets

(51) Int. Cl.
*G06V 10/764* (2022.01)
*G06V 10/82* (2022.01)

(52) U.S. Cl.
CPC ............... *G06T 2207/10028* (2013.01); *G06T 2207/20084* (2013.01); *G06T 2207/30244* (2013.01); *G06T 2219/004* (2013.01)

(58) Field of Classification Search
CPC . G06T 2207/20084; G06T 2207/30244; G06T 2219/004
USPC ......................................................... 345/419
See application file for complete search history.

(56) References Cited

U.S. PATENT DOCUMENTS

| | | |
|---|---|---|
| 2021/0275923 A1 | 9/2021 | Li et al. |
| 2021/0344891 A1 | 11/2021 | Holzer et al. |
| 2022/0004254 A1 | 1/2022 | Roberts et al. |

OTHER PUBLICATIONS

International Application No. PCT/US2023/064192, International Preliminary Report on Patentability dated Sep. 19, 2024, 7 pages.

\* cited by examiner

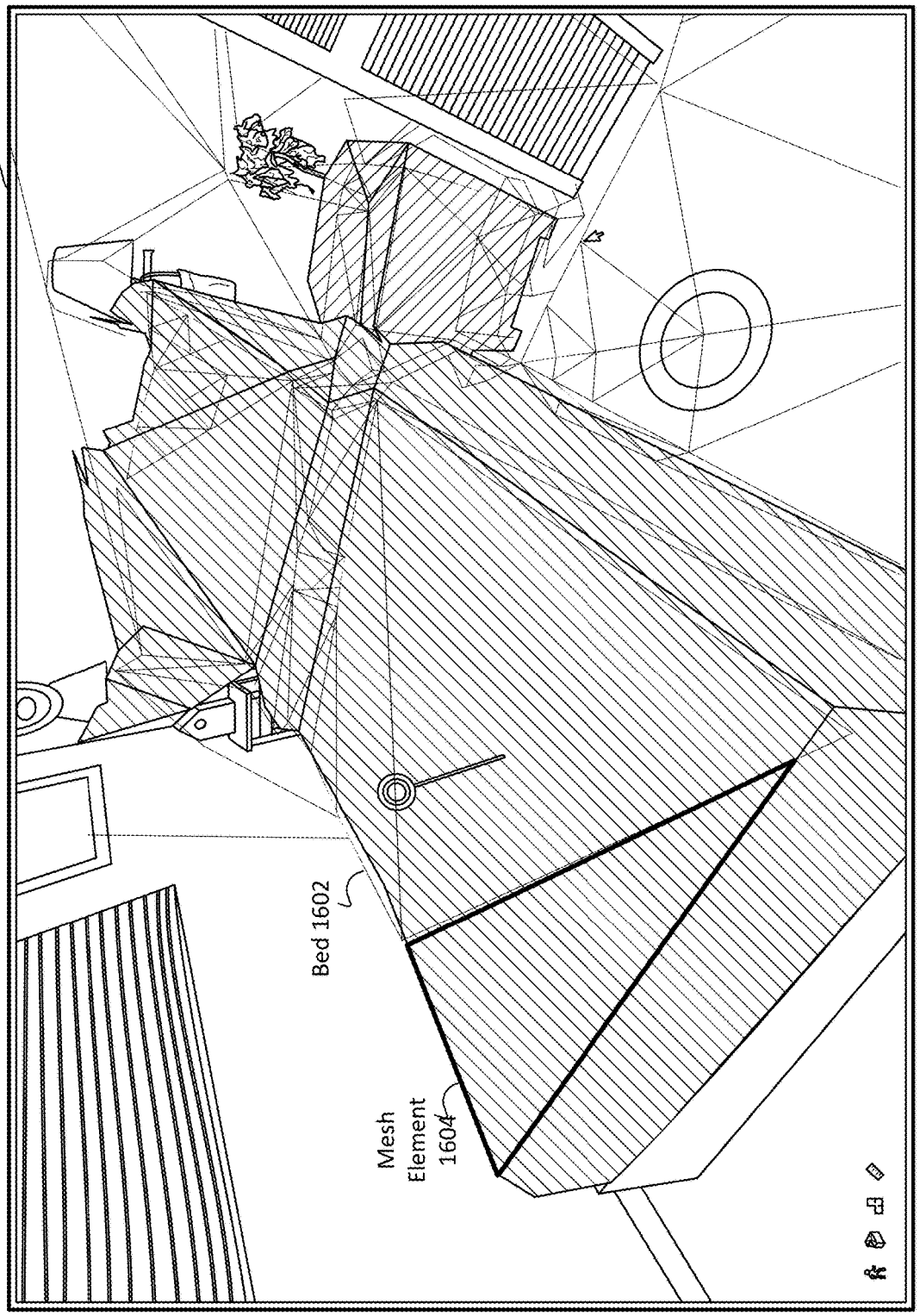

SYSTEM AND METHOD OF OBJECT DETECTION AND INTERACTIVE 3D MODELS

CROSS-REFERENCE TO RELATED APPLICATIONS

The present application claims benefit of U.S. Provisional Patent Application No. 63/269,168, filed Mar. 10, 2022, and entitled "Object Detection with Structured Images" and U.S. Provisional Patent Application No. 63/269,854, filed Mar. 24, 2022, and entitled "Object Detection with Structured Images" which is incorporated by reference herein.

FIELD OF THE INVENTION

Embodiments of the present invention(s) relate to interactive 3D visualizations to provide information regarding a 3D modeled environment and more generally to automated systems for object detection, object information collection, and interactivity to respond to user queries regarding a 3D model and objects contained therein.

BACKGROUND

Three-dimensional (3D) visualizations and walkthroughs typically enable users to view and/or engage with 3D models of a given environment. 3D model visualizations of a physical environment, such as a house, are becoming common. In one example, a user may access a 3D model through a website, such as a real estate website, and walk through a 3D model of a house. These 3D models, however, are limited to the walk through and certain graphical elements to enable the user to navigate through the space. The 3D model does not identify objects in the model nor does the 3D model allow a user to request information regarding the physical environment.

SUMMARY

An example system comprising one or more processors, and memory containing instructions to control the one or more processors to: receive a plurality of images representing an interior of a physical environment, identify, using a neural network for object recognition, a first object in a first image of the plurality of images, the first object being associated with first object location information, the first object location information indicating a location relative to the physical environment, identify, using the neural network for object recognition, a second object in a second image of the plurality of images, determine if the first object in the first image and the second object in the second image are located near or at a similar location of the physical environment based on location information associated with the first image and second object location information associated with the second image, if the first object and the second object are located near or at a similar location, then the first object and the second object are an instance of a single object, store the similar location associated with the single object, display an interactive walkthrough visualization of a 3D model of the physical environment, the 3D model including the single object, receive an object information request regarding object location through the interactive walkthrough visualization, and provide the similar location of the single object for display in the interactive walkthrough visualization.

In various embodiments, the instructions further control the one or more processors to determine if the first object and the second object are of a same object type. In one example, the first object and the second object are the instance of the single object if the first object and the second object are located near or at a similar location and the first object is the same object type as the second object. In another example, identify the first object using the neural network for object recognition further comprises categorizing the first object using the neural network to identify an object type of the first object. In one example system, the instructions further control the one or more processors to determine the first object location information and the second object location information based on a mesh of the 3D model. In some embodiments, the first image includes position and orientation of an image capture device that captured the first image in the physical environment, the instructions further control the one or more processors to determine the first object location information based on the position and orientation of the image capture device that captured the first image.

In one example system, the second image includes position and orientation of an image capture device that captured the second image in the physical environment, the instructions further control the one or more processors to determine the second object location information based on the position and orientation of the image capture device that captured the second image. In one example, the first image is associated with depth data of the physical environment, the depth data being generated by a depth data device, the first object location being determined based on the first object depicted in the first image and associated relevant depth data. The system of claim 8, wherein the depth data device is a LiDAR.

An example on-transitory computer-readable medium comprising executable instructions, the executable instructions being executable by one or more processors to perform a method, the method comprising: receiving a plurality of images representing an interior of a physical environment, identifying, using a neural network for object recognition, a first object in a first image of the plurality of images, the first object being associated with first object location information, the first object location information indicating a location relative to the physical environment, identifying, using the neural network for object recognition, a second object in a second image of a plurality of images, determining if the first object in the first image and the second object in the second image are located near or at a similar location of the physical environment based on location information associated with the first image and second object location information associated with the second image, if the first object and the second object are located near or at a similar location, then the first object and the second object are an instance of a single object, storing the similar location associated with the single object, displaying an interactive walkthrough visualization of a 3D model of the physical environment, the 3D model including the single object, receiving an object information request regarding object location through the interactive walkthrough visualization, and providing the similar location of the single object for display in the interactive walkthrough visualization.

An example method comprising: receiving a plurality of images representing an interior of a physical environment, identifying, using a neural network for object recognition, a first object in a first image of the plurality of images, the first object being associated with first object location information, the first object location information indicating a location relative to the physical environment, identifying, using the neural network for object recognition, a second object in a second image of a plurality of images, determining if the first object in the first image and the second object in the second image are located near or at a similar location of the physical environment based on location information associated with the first image and location information associated with the second image, if the first object and the second object are located near or at a similar location, then the first object and the second object are an instance of a single object, storing the similar location associated with the single object, displaying an interactive walkthrough visualization of a 3D model of the physical environment, the 3D model including the single object, receiving an object information request regarding object location through the interactive walkthrough visualization, and providing the similar location of the single object for display in the interactive walkthrough visualization.

Another example system comprising: one or more processors, memory containing instructions to control the one or more processor to: identifying a first view of a first object in a first two-dimensional image, the first view being a first collection of pixels associated with a first position and a first orientation of an image capture device when the image capture device captured the first two-dimensional image, identifying a second view of a second object in a second two-dimensional image, the second view being a second collection of pixels associated with a second position and a second orientation of the image capture device when the image capture device captured the second two-dimensional image, mapping the first collection of pixels to a position in a 3D model based on the first position and the first orientation of the image capture device, the 3D model being a representation of the physical environment, determining that the first object and the second object is a same physical object based on the second collection of pixels in the second two-dimensional image, the second position and the mapping of the first collection of pixels, and representing the same physical object in a 3D model of the physical environment using at least some of the first collection of pixels and the second collection of pixels.

In some embodiments, determining that the first object and the second object is the same physical object is also based on a depth map of the physical environment. In one example, a first object position of the same physical object in the 3D model is determined based on a depth map of the physical environment. In one example, the first collection of pixels are a first collection of surface elements and the second collection of pixels are a second collection of surface elements. In various embodiments, further comprising identifying an object type of the same physical object based on at least some of the first collection of pixels. In some embodiments, identifying the object type of the same physical object is further based on at least some of the second collection of pixels using a CNN to categorize the same physical object. In another example, the example system further comprising generating a first label associated with the object type and a position of the same physical object in the 3D model. The example system further comprising: identifying a third view of a third object in a third two-dimensional image, the third view being a third collection of pixels associated with a third position and a third orientation of the image capture device when the image capture device captured the third two-dimensional object, and determining that the third object is a different physical object than the first second object based on the third position and the mapping of the first collection of pixels. One example system further comprising identifying the object type of the third object, the object type of the third object being the object type of the first object. In various embodiments, the example system further comprising: generating a second label associated with the third object and incrementing a count of the object type indicating a number of the object type represented in the 3D model. Another example system further comprising: storing the first label and the second label in a data structure, receiving a query regarding position of objects of the object type within the 3D model, responding to the query based on information of the data structure, including the first label and the second label, a first object position of the first object in the 3D model, and the second object position of the third object in the 3D model, the first object position of the same physical object and the second object position of the third object being based on one or more depth maps of the physical environment.

BRIEF DESCRIPTION OF THE DRAWINGS

FIG. 16A depicts components of the mesh which make up objects in a physical environment according to some embodiments.

DETAILED DESCRIPTION

Figure 1:
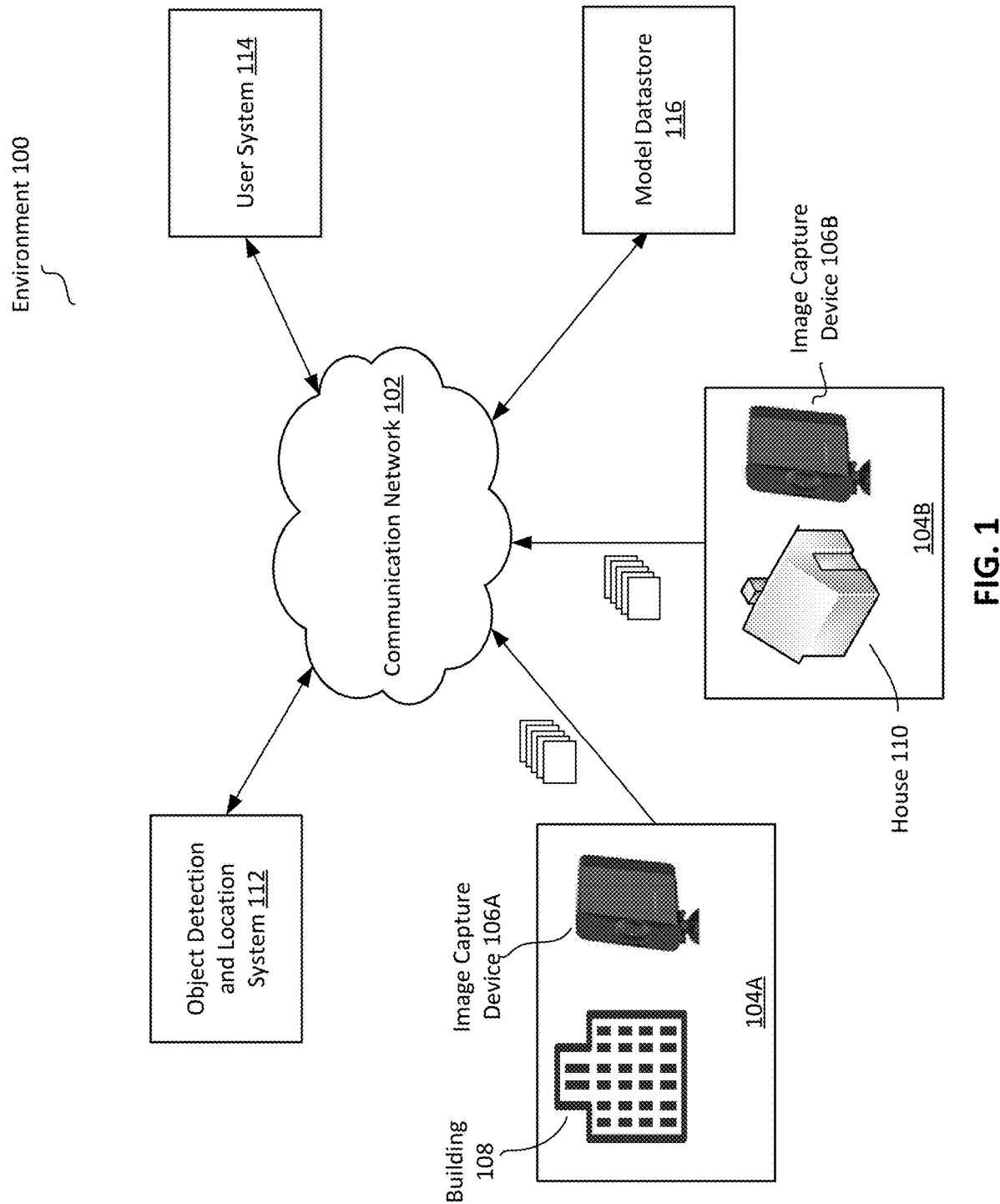
FIG. 1 depicts a block diagram of an example environment capable of receiving digital images of physical environments and automatically detecting objects depicted within the digital images and providing information regarding the detected objects.

Various embodiments described herein enable collection of information regarding different objects within a 3D model. Users may request information (e.g., by providing queries) regarding the 3D model (e.g., through interactivity with a visualization or walkthrough and/or an API). In response, various systems discussed herein may retrieve relevant information regarding objects in the 3D model and respond to the request by providing text, images, and/or changes to the user's 3D model visualization to provide information.

To enable collection of object information (e.g., location of objects in the 3D model, object type, number of objects of the same object type, and/or the like), objects that appear in the 3D model need to be identified and information about those objects collected. Historically, identifying objects depicted in images is performed manually. For example, a person may review one image at a time to manually tag and/or identify objects. The person may further manually provide descriptive metadata of the objects.

Unfortunately, manually tagging images is time-consuming, is expensive, and prone to errors, particularly when the collection of images to be tagged is large. As a result, manual tagging of images is not scalable as the number of images increases and/or the number of items to tag in an image also increases.

To avoid the human effort required by manual tagging, limited techniques have been developed to automatically recognize and tag digital images with certain types of information. For example, digital cameras can automatically store some types of information with each image, such as time, date, and GPS coordinates at the time at which the image is captured.

Various embodiments described herein include systems and methods for automatically identifying objects that appear or will appear in a 3D model, categorizing (e.g., tagging) the objects, identifying locations of the objects in the 3D models, collecting information about the objects, and storing the associated information. An interactive visualization of a 3D model (e.g., walkthrough interface to enable a user to walk through a 3D model) may be provided that allows the user to request additional information (e.g., through a query field or interactive GUI elements) regarding objects in the visualization (e.g., "how many electrical sockets are in the house?." The system may retrieve collected information regarding the identified object and provide a response to the request (e.g., by text, visual elements, and/or the like).

It will be appreciated that there are many ways to identify objects in images (e.g., using multiple images, using depth information, or using a mesh) as well as many ways to collect object metadata (e.g., the type of object, number of the object type per floor or in the building, location of one or more objects, and/or the like).

Various systems and methods described herein allow for a scalable system to automatically detect objects, differentiate objects from each other (e.g., identify different chairs on different floors), and collect location and other information per object. Performing these steps manually may be prone to error, slow, and computationally inefficient.

FIG. 1 depicts a block diagram of an example environment 100. The environment 100 includes a communication network 102, environment images 104A and 104B (individually, environment images 104 collectively), image capture devices 106A and 106B (individually, image capture device 106 collectively), a building 108, a house 110, an object detection and location system 112, a user system 114, and a model datastore 116.

In this example, the object detection and location system 112 may provide or enable visualizations and/or 3D models to allow users to perform walkthroughs of modeled environments. The object detection and location system 112 may provide an interactive visualization and/or options to allow users to request information regarding one or more objects depicted in the 3D model. The object detection and location system 112 may retrieve information to provide responses. In various embodiments, the object detection and location system 112 may automatically identify objects from 2D images and/or 3D models, collect information associated with the objects (e.g., identify the type of object, number of that particular type of object depicted in the 3D model or in a part of the 3D model, location of object(s) within a modeled environment, and/or the like).

In some embodiments, the communication network 102 represents one or more computer networks (e.g., LANs, WANs, and/or the like). The communication network 102 may provide communication between or among the environment, such as the image capture device 106, the object detection and location system 112, the user system 114, and the model datastore 116. In some implementations, the communication network 102 comprises computer devices, routers, cables, uses, and/or other network topologies. In some embodiments, the communication network 102 may be wired and/or wireless. In various embodiments, the communication network 102 may comprise the Internet, one or more networks that may be public, private, IP-based, non-IP based, and so forth.

In various embodiments, the environment images 104A includes digital images of a physical environment such as the interior of building 108. These images may be captured by placing one or more image capture devices 106A in different locations in the interior of building 108. In some embodiments, the environment images 104A includes digital images of an exterior of the building 108. The environment images 104A may depict enough of the interior of the building 108 (e.g., living space on every floor) such that the images may be the basis for the creation of a 3D model of the interior of the building 108.

The digital images or video captured by the image capture device(s) 106A may be sent to the object detection and location system 112. The image capture device(s) 106 may transmit the digital images to the object detection and location system 112. In various embodiments, the digital images of the interior and/or exterior of the particular location may be transmitted to the model datastore 116.

Alternately, the image capture device(s) 106 may be wirelessly coupled to a smart device and the smart device may provide the digital images to the object detection and location system 112. In some embodiments, the images may be downloaded to a card or other media for later uploading to the object detection and location system 112.

The image capture device 106 may include sensors and/or software for identifying a position and/or an orientation. In various embodiments, the image capture device 106 may associate a position and/or orientation of the image capture device 106 with one or more images captured by the image capture device 106 at that position and/or orientation. In one example, the position of the image capture device 106 may be provided by a GPS sensor for providing GPS coordinates or any other system to assist in location. The orientation of the image capture device may be identified based on position of the image capture device and the field of view from the lens of the image capture device. The orientation and/or position of the image capture device 106 may be determined or identified in any number of ways.

In some embodiments, the image capture device 106 is a complementary metal-oxide-semiconductor (CMOS) image sensor (e.g., a Sony IMX283~20 Megapixel CMOS MIPI sensor with the NVidia Jetson Nano SOM). In various embodiments, the image capture device is a charged coupled device (CCD). In one example, the image capture device is a red-green-blue (RGB) sensor. In one embodiment, the image capture device 106 is an infrared (IR) sensor. The image capture device 106 may include a lens assembly to give the image capture device a wide field of view.

In some embodiments, image capture device 106 may include a depth sensor (such as LiDAR, SPAD, or structured light) to obtain depth data. Depth data may be defined as the distance between a point in the physical environment depicted in a pixel of an image captured by the image capture device to the image capture device. Alternately, in other embodiments, depth data may be obtained using multiple image sensors, such as stereo-assisted imaging, where multiple image sensors are offset by a predetermined distance. These multiple image sensors may capture substantially the same physical environment at a slight offset. Digital images captured by these multiple image sensors may be utilized by a processor to create or enhance an illusion of depth in the form of a three-dimensional image.

In still other embodiments, the depth data may be captured by a LiDAR device (not depicted in FIG. 1) that is separate from the image capture device 106. It will be appreciated that depth data from a LiDAR sensor (e.g., either as a part of or separate from the image capture device 106) may not be available.

In various embodiments, the depth data defines depth and/or location information regarding the physical environment being scanned. The depth data may be associated with the location of objects, walls, floors, ceilings, and the like that may be the subject of the images captured by the image capture device(s).

In some embodiments, the object detection and location system 112 may receive any number of two-dimensional images of the physical environment from the image capture device(s) 106.

The object detection and location system 112 may utilize different methods or approaches to identify and categorize objects depicted in the two-dimensional images. The method or approach used by the object detection and location system 112 may depend on the type of two-dimensional images received by the object detection and location system 112. Different processes may include, but are not limited to, identifying objects based in part on orientation and position of the image capture device(s) 106 that captured the images, using depth data (e.g., either generated depth data from the images or LiDAR system), or from a mesh.

In one example, the object detection and location system 112 receives two-dimensional images (and optionally depth data) of the physical environment from the image capture device 106. In this approach, objects are identified or detected in two dimensions in a subset of two-dimensional images (e.g., through use of a neural network such as R Mask CNN). The objects (e.g., pixels associated with the identified objects) may be mapped to a three-dimensional surface or position of the physical environment. A collection of images of a particular identified object may be identified based on the mapping, and once the collection of images of the particular object is identified, the image information (e.g., pixels) of different views of the same physical object may be used in a 3D model visualization to depict the object (e.g., in one or more viewpoint orientations).

In some embodiments, the object detection and location system 112 trains a neural network or uses a trained neural network to recognize a particular type of object depicted in two-dimensional images. Once trained, the neural network may identify objects from images captured by one or more image capture devices 106. An object type is a particular type of object or a type of a group of objects. For example, an object type may be a "chair," "table," "fireplace," "outlet," "toilet," "shower," "sink," or the like. An object instance is a particular object of that object type. For example, an individual chair located in a room in front of a fireplace is an instance of a chair and has an object type of "chair," A different individual chair sitting on a different floor is a different instance of a chair (i.e., there are two chair instances in this example) and they are both an object type of "chair," even though the chairs may be radically different form each other (e.g., one may be a kitchen table chair while the other may be a recliner).

In some embodiments, the neural network may locate each pixel of every object in the image, for instance, using instance segmentation (e.g., using Mask R-CNN or any R-CNN process). For each image, the object detection and location system 112 may create region proposals, classify the region proposals, and generate segmentation masks to identify specific objects for identification (e.g., tagging and/or labeling), counting, and/or location.

Figure 19:
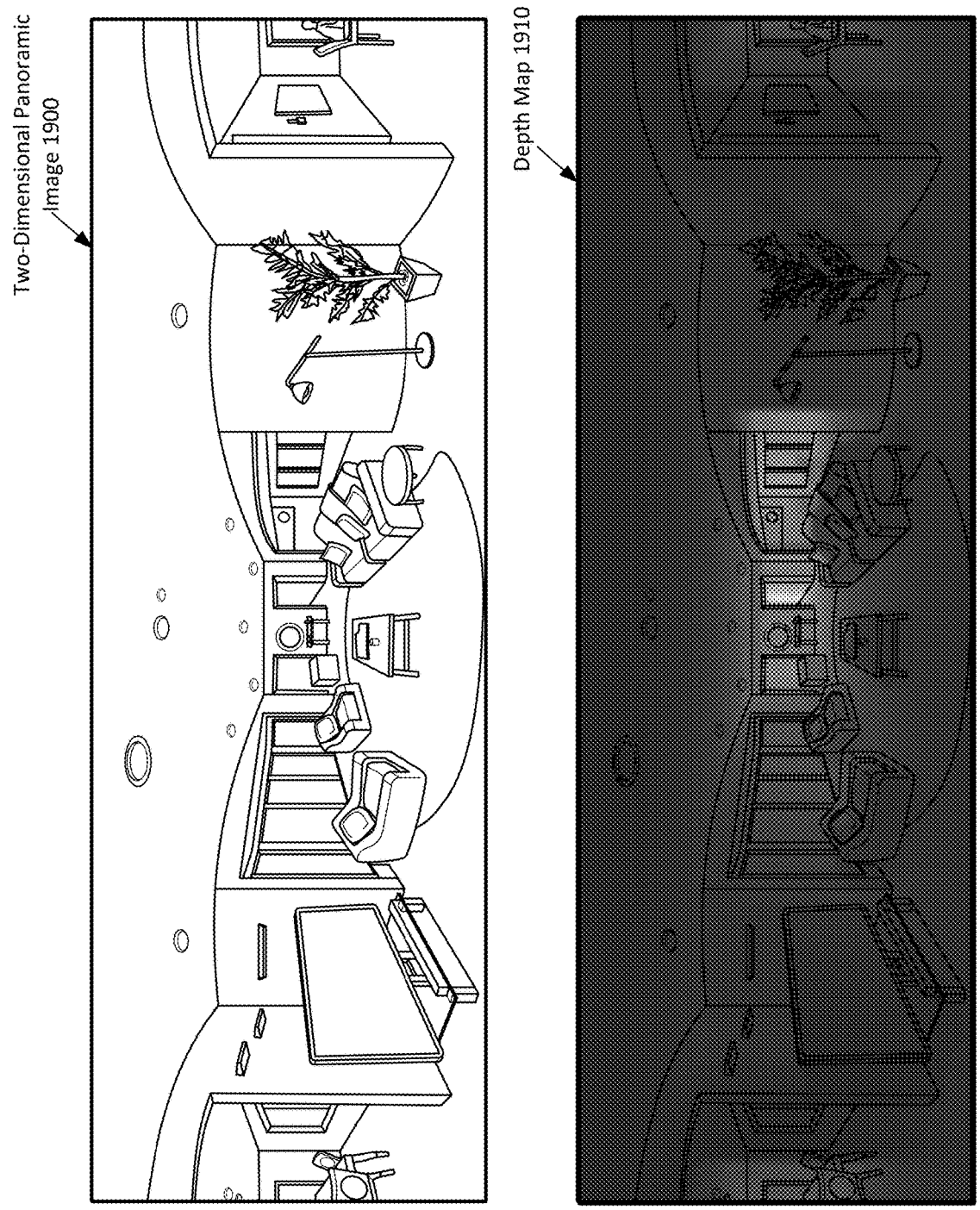
FIG. 19 depicts an example of a two-dimensional color image and a corresponding two-dimensional depth math according to some embodiments.

In various embodiments, the object detection and location system 112 provides (e.g., streams and/or outputs) to a digital device (e.g., the user system 114 or a remote website) all or part of a 3D model. A user may utilize the user system 114 to view all or part of the 3D model (such as an example two-dimensional panoramic image 1900 of FIG. 19).

Figure 4:
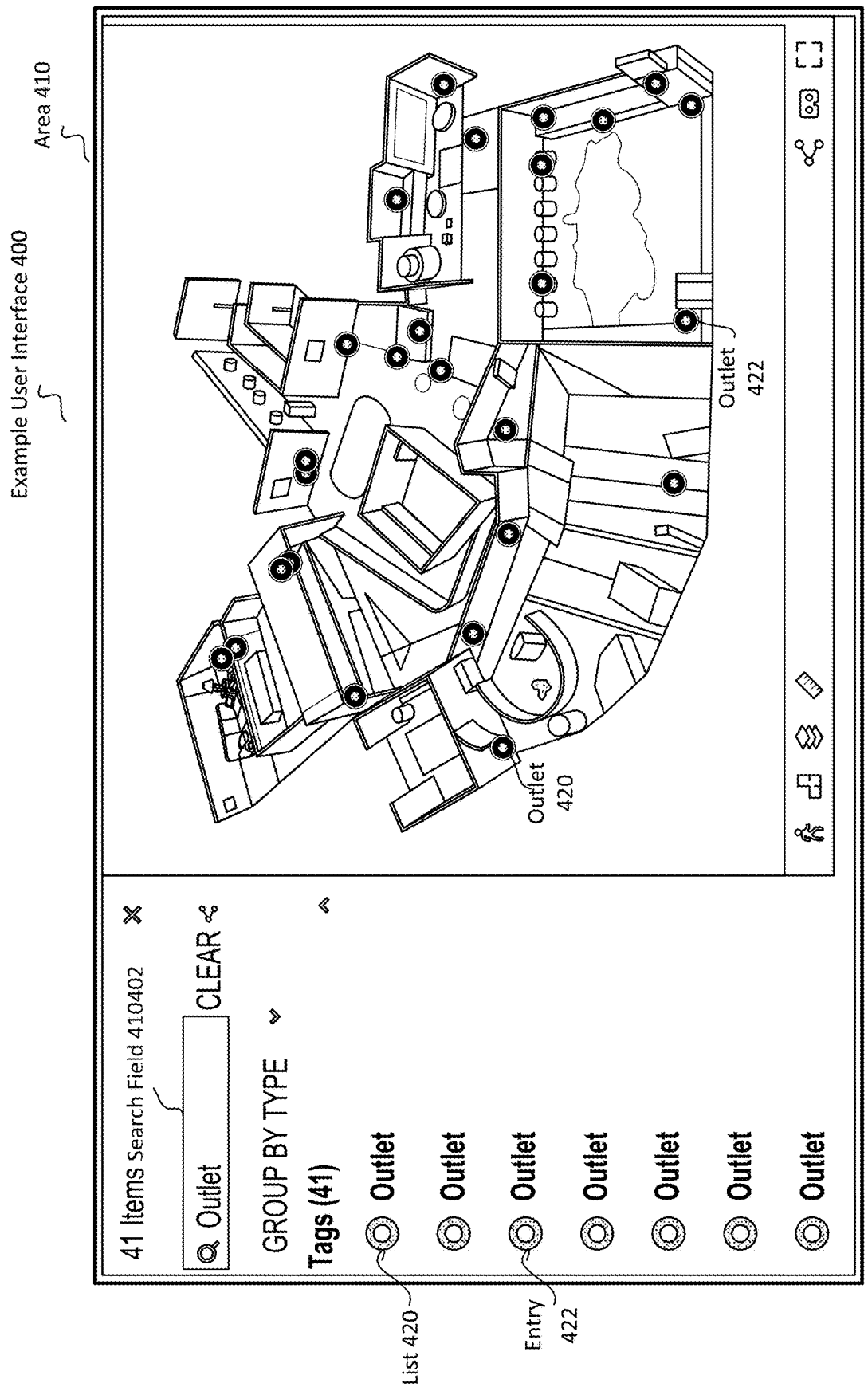
FIG. 4 is an example of an example user interface that identifies the locations of multiple detected objects of a similar type according to some embodiments.

In some embodiments, the object detection and location system 112 may provide a visual representation of an area of a floorplan of a building (i.e., a visualization of the 3D model) to the user system 114. FIG. 4 is an example user interface 400. The user of the user system 114 may interact with area 410 to view and navigate around that portion of the building. In some embodiments, the user may interact with a list 420, which provides multiple instances of objects in a given object type (i.e., a category of object).

In various embodiments, the example user interface 400 provides an interactive walkthrough of the 3D model (e.g., a walkthrough of the 3D model of the physical environment). In the example of FIG. 4, the list 420 lists identified outlets located in the 3D model. The user may interact with one particular outlet, such as entry 422. In response, the user interface 400 may provide the location of the particular outlet in the floorplan of the building.

In some embodiments, the example user interface 400 may depict a dollhouse view of a walkthrough view of the 3D model. In response to the user's query, the example user interface may retrieve information and/or provide a response to the user. In some embodiments, the visualization module 218 may indicate positions in the 3D model to indicate objects of the object type indicated by the query. In FIG. 4, for example, the visualization module 218 may highlight, denote, annotate, or the like the position of each outlet on the 3D map in response to the query. It will be appreciated that the visualization module 218 may indicate the objects of interest in any number of ways (e.g., by pulsing, glowing, highlighting, arrows, and/or the like).

In some embodiments, the user system 114 is a digital device that may communicate with other digital devices and systems. A digital device is any device with a processor and memory. In some embodiments, the user system 114 may be or include one or more mobile devices (e.g., smartphones, cell phones, smartwatches, tablet computers, or the like), desktop computers, laptop computers, and/or the like. In some embodiments, users may interact with the user system 114 using, for example, a web browser or mobile application to communicate with the object detection and location system 112.

In some embodiments, the object detection and location system 112 provide images representing the location of objects detected by the object detection and location system 112 to the user system 114. In various embodiments, the object detection and location system 112 may provide a tag or label which includes physical or semantic information regarding an object, such as an object category or properties of the detected object. An example of this can be seen in FIG. 20. The user may interact with an example user interface 2000, which depicts an area of a physical environment and an icon that depicts a location space where the object is located.

In some embodiments, the model datastore 116 may be any structure and/or structures suitable for captured data such as 3D models, LiDAR data, images, and/or the like. In some examples, the model datastore 116 is an active database, a relational database, a self-referential database, a table, a matrix, an array, a flat file, a documented-oriented storage system, a non-relational No-SQL system, an FTS-management system such as Lucene/Solar, and/or the like. The model datastore 116 may store the digital images or video captured by the image capture device 106. In some embodiments, the model datastore 116 may store three-dimensional models of an interior and/or exterior of various physical environments. Three-dimensional models may be created by the object detection and location system 112. In one example, a three-dimensional model may be created by a third-party software application (not shown).

Figure 2:
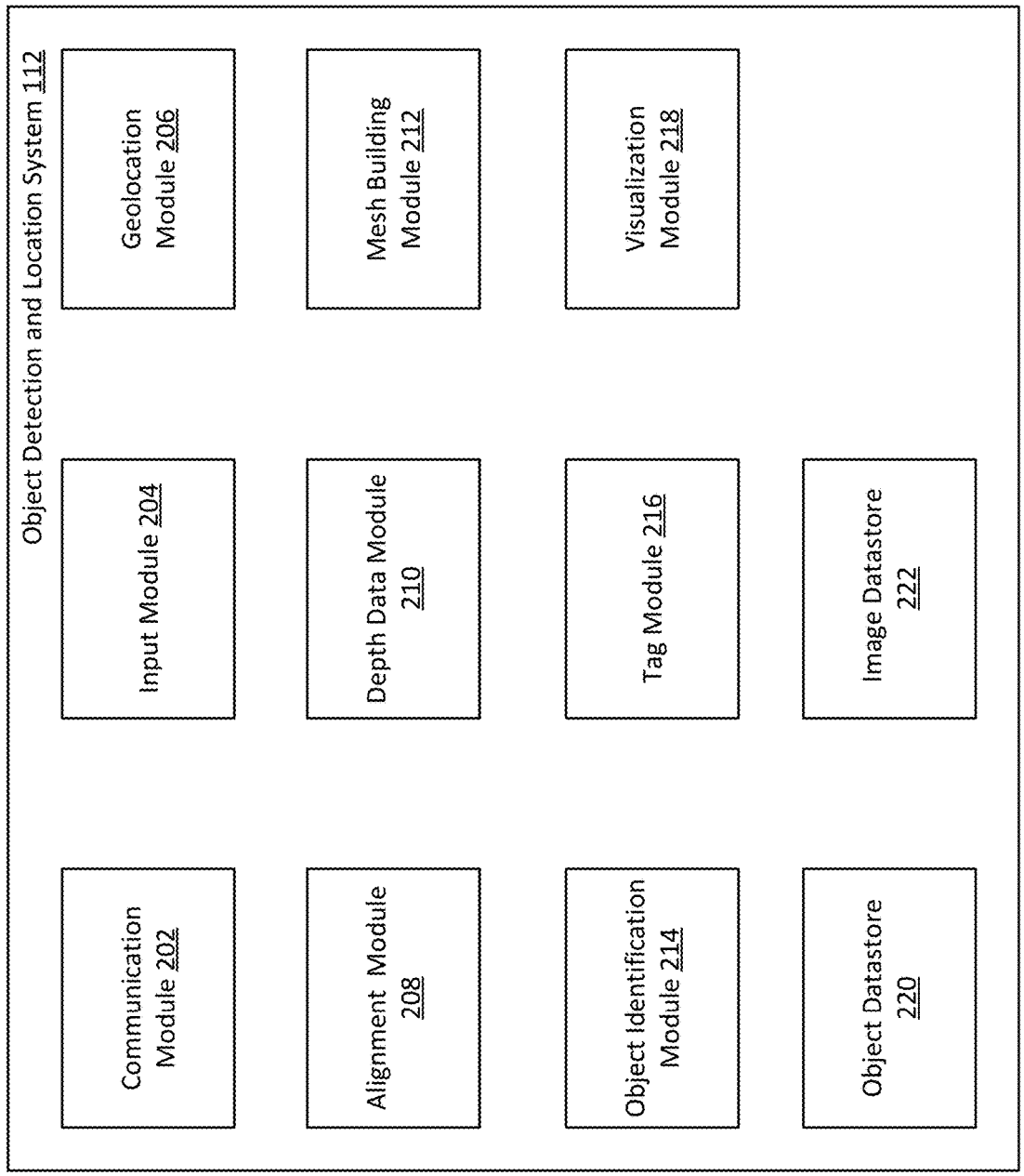
FIG. 2 depicts a block diagram of the object detection and location system according to some embodiments.

FIG. 2 depicts a block diagram of the object detection and location system 112 according to some embodiments. The object detection and location system 112 includes a communication module 202, an communication module 204, a geolocation module 206, a depth data module 210, an alignment module 208, a mesh building module 212, an object identification module 214, a tag module 216, a visualization module 218, an object datastore 220, and an image datastore 222.

The communication module 202 may send and request requests, images, or data between any of the modules or datastores of the object detection and location system 112 and devices of the environment 100 of FIG. 1.

The communication module 204 may receive any number of two-dimensional images captured by the image capture device 106 of the physical environment (e.g., the interior of a building, facility, house, or the like). In some embodiments, the communication module 204 receives depth data of the physical environment from the image capture device 106.

In one example, two-dimensional images captured by any number of image capture device(s) 106 of a house interior (e.g., a physical environment) is provided to the object detection and location system 112. The communication module 204 may receive the two-dimensional images. In some embodiments, the communication module 204 may receive depth data of the house interior from a depth sensor (e.g., that is a part of the image capture device 106 or is separate from the image capture device 106).

In some embodiments, the geolocation module 206 may communicate with external location systems such as the global positioning system (GPS). The geolocation module 206 can match one or more of raw GPS coordinates (e.g., captured by the image capture device 106 or digital device when the image(s) were captured) with a single capture location based on the time when the image data was captured at the capture location and the time when the GPS measurements were captured.

For example, in implementations in which image data is captured at one or more capture locations by rotating the image capture device about a fixed axis, the two-dimensional images may be time-stamped with information indicating the start time and end time of the rotation. According to this example, the geolocation module 206 can identify GPS coordinates captured between the start and end time of the rotation and associate these GPS coordinates with the capture location.

In other implementations, the geolocation module 206 can be configured to associate raw GPS coordinates with a specific capture location based on the GPS coordinates within a defined time range relative to the time of capture of an image at the capture location. In this regard, the geolocation module 206 can group or cluster sets of raw GPS coordinates with single capture locations based on time stamp information associated therewith. In accordance with clustering raw GPS coordinates based on matching their capture times to capture times/periods associated with respective capture location, in some implementations, the geolocation module 206 can also remove any GPS coordinates captured at times that do not correspond to image capture times (e.g., remove GPS coordinates captured between capture positions).

In various embodiments, the geolocation module 206 may be present on the image capture device 106 or a digital device local to the image capture device 106 that is capable of taking GPS coordinates. In this example, the object detection and location system 112 may not include the geolocation module 206.

In some embodiments, two or more of the two-dimensional images received from the image capture device 106 requires alignment from the alignment module 208 to generate a two-dimensional panoramic image (up to 360°) of the physical environment. In one example, the alignment module 208 aligns two-dimensional images (e.g., panoramic images) and depth data of the same physical environment to generate a three-dimensional model of the physical environment. In some embodiments, the object identification module 214 identifies three-dimensional objects from the three-dimensional model.

The depth data module 210 may determine the depth data associated with two-dimensional images received by the object detection and location system 112. In some embodiments, the depth data module 210 receives depth data from the image capture device 106 (or a depth device such as a LiDAR) in the form of a time lapse between an outgoing light pulse and the detection of the reflected light pulse. The time-lapse determines the distance from the depth sensor to a particular point in the physical environment.

In various embodiments, the depth data module 210 is present on the image capture device 106 or a device that is local to the image capture device 106 when depth data is captured. In some embodiments, the object detection and location system 112 may not include the depth data module 210.

The object detection and location system 112 may utilize a two-dimensional image along with depth data to generate a three-dimensional model (e.g., 3D model) of the physical environment (e.g., a house interior).

In some embodiments, the depth data module 210 includes a machine learning algorithm (e.g., neural network) that estimates depth data of all or part of the scanned physical environment using two or more of the two-dimensional images of the physical environment. The machine learning algorithm may utilize characteristics of the two-dimensional image, such as color or light intensity, to determine the distance of pixels in the image from the image capture device. In the case where the image capture device 106 includes multiple image sensors, such as stereo-assisted imaging, where multiple image sensors are offset by a predetermined distance, the depth data module 210 may utilize offset images of the physical environment to determine the depth data of the environment captured in one or more images.

In some embodiments, before a three-dimensional model of the physical environment can be generated, a mesh of the environment is created by the mesh building module 212. A mesh may comprise a series of triangles, lines, curved surfaces (e.g., non-uniform rational basis splines ("NURBS")), quads, n-grams, or other geometric shapes can connect the collection of points. In an aspect, portions of the mesh can include image data describing texture, color, intensity, and the like. In various embodiments, captured 2D panoramic images (or portions thereof) can be overlaid over portions of the mesh to create a textured mesh. The textured mesh may include walls, floors, ceilings, and individual objects within the space. The texture mesh may be dimensionally accurate, allowing users of a user interface to determine a physical distance between two points in a three-dimensional model of the physical environment. In one example, the mesh building module 212 utilizes methods of creating a mesh such as Laplacian smoothing, parallel mesh generation, or stretched grid method.

In one example, the mesh is a triangle mesh, where pixels in a particular triangle of the triangle mesh represent an area of the environment on a common plane. The subject digital 3D models can thus be generated based on 2D image data, 2D sensory data, sensory data in combination with raw 2D data, 3D spatial data (e.g., spatial depth and distance information), computer-generated positional data, and the like. In some embodiments, the three-dimensional model of the physical environment is generated without the use of a mesh.

In some embodiments, the object identification module 214 includes trained machine learning (ML) algorithms to identify objects captured in one or more images of the physical environment. In one example, the object identification module 214 identifies multiple objects from different two-dimensional images of the physical environment. An object captured by a two-dimensional image may represent an instance of the physical object at one or more particular viewpoints. Each instance of an object may be associated with a three-dimensional surface in physical space which indicates a location within the 3D model.

Each three-dimensional object detection may not be a unique object in the physical environment. It will be appreciated that the same object may be captured in different images at different viewpoints. For example, three-dimensional object detections 1712, 1722, and 1732 of FIG. 17A, FIG. 17B, and FIG. 17C respectively corresponds to the same chair from different points of view.

Each separate object identified from the images may correspond to one instance of a particular object in a three-dimensional model of the physical space. Each instance of the particular object may be categorized by the object identification module 214. Different instances of the same object may be categorized as a different object. Aggregate confidence may be used to categorize a particular object using the individual category of each of the different instances of the same object.

For example, two objects may be both be categorized as "chairs" although the objects are different from each other (e.g., one a kitchen chair while the other is rocking chair). The category may be referred to herein as an "object type" (e.g., both instances have the same "object type" that is "chair"). In this example, both the kitchen chair and the rocking chair are different instances (i.e., different object instances).

In one or more embodiments, the object identification module 214 can be configured to identify objects (e.g., structural objects, fixtures, appliances, furniture, decorative objects, people, places, things, etc.) that appear in a 3D model using hardware, software, or a combination of hardware and software that provides for automated detection of visual objects appearing in images, video, or 3D models. For example, with reference to a 3D model that depicts an interior space of a home, the object identification module 214 can identify walls, floors, ceilings, windows, fixtures, appliances, furniture, and the like. The object identification module 214 can further identify groups of objects associated with one another. For example, the object identification module 214 can identify groups of objects associated with a particular room (e.g., the kitchen, or a bedroom). Object recognition algorithms rely on matching, machine learning, or pattern recognition algorithms using appearance-based or feature-based techniques. Common techniques include edge detection, gradients, histogram of oriented gradients (HOG), Haar wavelets, and linear binary patterns. In various embodiments, the object identification module 214 can identify objects appearing in image data associated with a 3D model using a variety of models, including but not limited to: extracted features and boosted learning algorithms, bag-of-words models with features such as speeded-up robust features (SURF) and maximally stable extremal regions (MSER), gradient-based and derivative-based matching approaches, Viola-Jones algorithm, template matching, deep learning, image segmentation and blob analysis.

In some implementations, the object identification module 214 can determine detailed characteristics associated with identified objects to increase the accuracy of identifying a potential tag to associate with the respective objects. The detailed characteristics can include any potential characteristic about an object that can be discerned by the object identification module 214. For example, the detailed characteristics can relate to a color or colors of the object, a type of the object, a dimension of the object, a material of the object, a make or brand associated with the object, an identity associated with the object, etc. For instance, in addition to detecting an appliance included in the kitchen of a 3D model, the object identification module 214 can determine that the appliance is microwave, determine the brand of the microwave, the model of the microwave, and a size of the microwave.

In some embodiments, the object identification module 214 can employ contextual information received in association with the capture process to facilitate identifying an object included in a 3D model. For example, in some implementations, during the capture process, a user can provide spoken notes or annotations about the environment being captured. For instance, as the user is scanning a living room with a 3D capture device, the user can provide spoken notations about the objects the user sees in person and/or in captured 2D/3D image data. For example, the user may state that the living room has hardwood floors, the type of wood of the floors, the company from which the flooring was purchased, and any other possible descriptive information that the user might know that can facilitate identifying the floors and/or associated tag data with the floors when rendered in a 3D model of the living room. These spoken notations can be associated with specific image data captures (e.g., 2D images) as well as position information associated with the image data captures, including position information for pixels or points respectively included in the 2D images. In addition, the object identification module 214 can employ sensor measurement information (e.g., temperature, pressure, light, etc.) associated with a captured 2D or 3D image data of the environment to facilitate identifying objects included in the 2D or 3D image data. Thus in some embodiments, the object identification module 214 can employ the contextual cues previously associated with image data of the 3D model to identify and characterize objects in the 3D model.

In addition, rather than attempting to recognize and characterize all potential taggable objects included in a 3D model, the object identification module 214 can employ contextual annotation information received during the capture process that indicates what objects to specifically identify and characterize for tagging purposes. For example, this contextual annotation information can include verbal annotations provided by a user during the capture process as well as image based contextual information. For example, the user can take a close up picture or video of an object and/or logo on the object to facilitate automated object recognition of the object and to indicate a tag is desired to be associated with the object. In other embodiments, a user can provide input selecting a point or set of points included in 2D or 3D image data associated with a 3D model (e.g., including captured image data prior to alignment and representations of the 3D model generated after generation of the 3D model) that the user desires to apply a tag. The object identification module 214 can further be configured to analyze the visual and structural characteristics associated with the point or set of points to determine and characterize the object associated therewith.

In various embodiments, the tag module 216 defines a tag for one or more objects and may associate a tag with a particular point in the three-dimensional model. In one or more implementations, the tag module 216 can label or tag a particular point, area, object of interest, object instance, or the like. A tag may be depicted in the visualization by the visualization module 218 (discussed herein). The tag may be include or be a text, an image, a video, audio, and/or hyperlink. in various embodiments, the tag module 216 identifies (e.g., by tag and/or label) an object, path, or point of interest in a visualization of a 3D model. The tag module 216 may identify objects with tags from the object identification module 214.

In some embodiments, a user interacting with a GUI and/or visualization of the 3D model may provide a tag to be associated with an object, point, or the like of the 3D model. For example, after selection or identification of a point, area, or object of interest, a user can create, upload, attach, embed, link, select, or otherwise provide input to the tag module 216, including the tag for association with the point, area or object of interest. In some embodiments, a tag is used to describe or provide additional information (e.g., semantic information, emotional information, historical information, incidental information, etc.) regarding the point, area, or object with which the tag is associated.

In some embodiments, the tag module 216 can associate additional metadata with the tag, such as information regarding an author or creator of the tag, a timestamp associated with creation of the tag, the three-dimensional model associated with the tag, location of the tag relative to the 3D model, location of the tag relative to the physical environment (e.g., floor), object type or category of object, and/or the like. In general, a tag can be applied to or associated with a point, area or object in a 3D model. For example, in some implementations, a tag can be associated with a discrete 3D point associated with a 3D model. A tag can also be associated with a group of 2D or 3D points on or within a 3D model. In another example, a tag can be associated with a face/surface or set of faces/surfaces included in the 3D model. In another example, a tag can be associated with an edge of group of edges situated on a structural surface of the 3D model. In another example, a tag can be associated with a volume, or a group of volumes, enclosed or containing one or more structural surfaces in a 3D model. A tag can also be associated with an area or volume of free space in the model. A tag can also be applied to or associated with a visual image or subset of images which are components of a 3D model. In another aspect, a tag can be associated with a specific viewpoint relative to the 3D model. For instance, when applied to an architectural building, a tag can be associated with a particular viewpoint of the building, a room in the building, a wall in the building, fixture in the building, a piece of furniture in the building, a decoration in the building, and the like. The size, shape and appearance of a tag icon can vary. In some embodiments, the size, shape and appearance of a tag icon for a tag can be tailored based on the preferences of the author or system that applies the tag. For example, the author can select a particular symbol to represent a tag, a size of the symbol, a dimension of the symbol, a color of the symbol, an opacity or skew of the symbol and the like. In other implementations, different types of tag icons and/or appearances of tag icons can be employed to differentiate between characteristic of the tag represented by the tag icon. For example, different types or colors of tag icons can be employed to identify different authors or entities that applied the tag. In another example, different types or colors of tag icons can be employed to designate the type of the tag data or metadata of the tag, such as whether the tag provides text data, image data, audio data, video data, hyperlink data, etc. For instance, a music symbol can be employed to represent tag data that includes music or a picture of film tape or a video camera can be employed to represent tag data that includes a video. In another example, different types or colors of tag icons can be employed to designate a class or category associated with a tag. In another example, different types or colors of tag icons can be employed to indicate a timestamp associated with a tag.

The particular tags and associated tag icons that are included in a representation of a 3D model that is presented to a user can also vary based on various factors, including factors related to preferences of the author or entity that applied the tag as well as factors related to the user viewing/consuming the 3D model and the viewing context. For example, various points, areas or objects in a model can be associated with different tags. In addition, a single point, area or object in a 3D model can be associated with multiple tags. The particular set or subset of tags and associated tag icons associated with a 3D model that are presented to an end user can vary based on characteristics of the end user (e.g., preferences, demographics, etc.), the client device at which the 3D model is presented, and a viewing context (e.g., location, time of day, day of year, mobility state, etc.). In some embodiments, an entity that applied the tags or otherwise has authority regarding how the tags and associated tag icons are rendered to end users can specify when one or more of the tags and associated tag icons are presented to end users. The tag module 216 can integrate and/or display the tags and associated tag icons in representation of the 3D model accordingly. For example, the entity can customize the particular tags and/or tag icons that are presented to end users based on a characteristic of the end user (e.g., a preference, a profile, a demographic characteristic, etc.), a characteristic of the client device (e.g., type and size of display), a viewing context (e.g., including location, time of day, time of year, mobility state, etc.), and the like.

In some embodiments, interaction with a particular tag icon can trigger a response associated one or more related tags. For example, in some implementations, tags can be grouped based on various factors. For instance, tags may be grouped based on association with a same room, a same type of object, a same date, a same manufacturer, a same price factor, a same author, a same decorator, etc. According to these embodiments, selection of or interaction with one of the tag icons for a tag included in a defined group can cause any number of other the tags in the group to take on a particular state, such as becoming activated, highlighted, hidden, changed in size, shape, or position, etc. For example, in one implementation, selection of one tag icon for a tag included in a group of tags can result in the tag icons for only the tags in the group to be displayed. Other tag icons in the model not associated with the group can be removed from display or displayed in a lighter or more transparent color. In another example, selection of one tag icon for a tag included in a group of tags can result in the tag icons for only the tags in the group to be highlighted. In another example, selection of one tag icon for a tag included in a group of tags can result in the tag for all tags in the group to be displayed in a side panel. In one example, a user may submit a search query in a search field 402 of FIG. 4 for outlets in a three-dimensional model of the house 110. The object detection and location system 112 may receive the search query. A request to search the object datastore 220 for object type entries and object instance entries corresponding to the search query. In the example of FIG. 4, the object datastore 220 may receive a search query for outlet. A search of the object datastore 220 is performed for object instance entries which have been categorized or identified as outlets. In some embodiments, each object instance entry is associated with one particular outlet found in the house 110. Each object instance entry may include identifiable information about the object, such as a category and unique object identifier and properties of the object. Furthermore, the object datastore 220 may perform a search of object type entry which correspond to outlets. The object type entry may include an incremental count of the number of outlets in the 3D model of the physical environment.

The visualization module 218 may enable a visualization or walkthrough of the 3D model. The 3D model may be generated based on the two-dimensional images provided by one or more image capture device(s) 106 and/or depth data. In various embodiments, the visualization module 218 provides the visualization or walkthrough (e.g., through downloaded or streamed code) to one or more other digital devices for interaction by a user (e.g., to walk through the 3D model).

In some embodiments, the visualization module 218 provides for interactions through the visualization, by an API, or other means. In one example, a user may provide a query or interact with GUI elements provided by the visualization module 218 to request information regarding one or more objects identified by the object identification module 214. The request may be for a number of different object types (e.g., number of electrical objects on a floor or in a residence), location of one or more different object instances within the 3D model or the physical environment, or the like. The visualization module 218 may retrieve information previously stored by the object identification module 214 and/or the tag module 216 and provide a response. In some embodiments, the response is in the form of text (e.g., a list or number) and/or a visualization may be used to indicate location of object instance(s) that are responsive to the request.

The object datastore 220 may be any structure and/or structures suitable for storing object instance entries or object type entries. For example, the object datastore 220 may be an active database, a relational database, a self-referential database, a table, a matrix, an array, a flat file, a documented-oriented storage system, a non-relational No-SQL system, an FTS-management system such as Lucene/Solar, and/or the like. The object datastore 220 information regarding location, object types, or number of objects identified by the object identification module 214.

In some embodiments, the object datastore 220 stores information regarding an object in an object instance entry. An object instance entry may contain or indicate a particular instance of an object type. An object type entry may be associated with a particular object type. In some embodiments, the object datastore 220 may store an object type number indicating the total number of objects of that object type on a floor of the 3D model, portion of the 3D model, and/or entire 3D model. For example, when the object identification module 214 identify an instance of a dining room chair, the object identification module 214 may send a request to the object datastore 220 to create an object instance entry associated with that particular dining room chair. Furthermore, the object identification module 214 may increase an incremental count of the object type entry associated with dining room chair.

Each object instance entry may be associated with one object identified by the object identification module 214. The object instance entry may include identifiable information about the object, such as a category and unique object identifier. The object instance entry may also include properties of the object such as 3D coordinates (points in a 3D Euclidean space), physical properties of the object such as an estimated size of the object and color, and brand of the object (if applicable). In some embodiments, the object datastore 220 includes properties of a tag or icon which represents the object in the three-dimensional model, such as a size, shape, or location of the icon which represents the object.

The image datastore 222 may be any structure and/or structures suitable for digital images, including two-dimensional panoramic images, three-dimensional panoramic image, 3D models, and/or the like. Like the object datastore 220, the image datastore 222 may include or be an active database, a relational database, a self-referential database, a table, a matrix, an array, a flat file, a documented-oriented storage system, a non-relational No-SQL system, an FTS-management system such as Lucene/Solar, and/or the like. In some embodiments, the object datastore 220 stores depth data generated by the depth data module 210. In various embodiments, the object datastore 220 stores properties associated with the image capture device or properties associated with each of the multiple image capture or depth capture used to determine the three-dimensional panoramic image.

Figure 3:
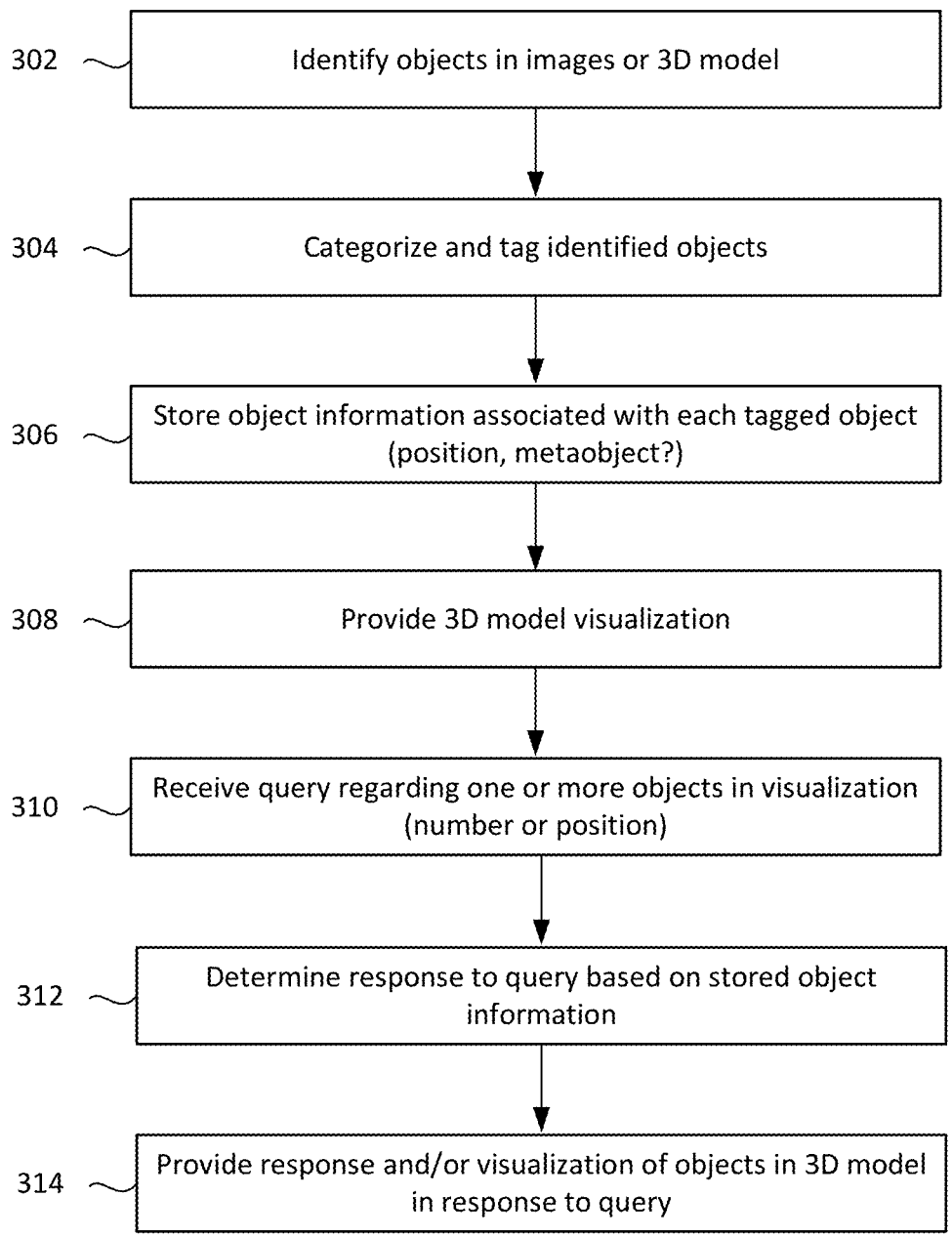
FIG. 3 depicts a flowchart of an object detection process according to some embodiments.

FIG. 3 depicts a flowchart of an object detection process 300 according to some embodiments. In various embodiments, the communication module 204 receives multiple two-dimensional images and/or a three-dimensional model of the physical environment. In some embodiments, the communication module 204 receives from an image capture device 106 any number of two-dimensional images. The communication module 204 may receive, In some embodiments, depth information from the image capture device 106 or another device.

The 3D model, if received, may be created by a third-party software application (not shown). In some embodiments, the communication module 204 receives the two-dimensional images and/or three-dimensional model from other sources, such as the model datastore 116. In one example, views 700, 800, 900, and 1000 of FIG. 7 through 10, respectively depicts an example of a collection of two-dimensional images of a physical environment from different viewpoints.

In some embodiments, the alignment module 208 can align or "stitch together" respective 2D images captured by a 2D/3D panoramic capture device (e.g., Image capture device 106) to generate multiple two-dimensional images. For example, the alignment module 208 can also utilize GPS coordinates of the 106 during the capture of each two-dimensional image to determine an alignment of one or more two-dimensional images.

The alignment module 208 may also employ depth information regarding the relative positions of respective visual features included in the respective 2D images to further align the respective 2D images to one another in association with generating a 2D panoramic image. The alignment module 208 may further perform blending and/or graph cuts at the edges to remove seams. In various embodiments, the alignment module 208 may utilize characteristics or properties of the two-dimensional image, such as color or light intensity, to align or stitch the imaging together.

In some embodiments, the object detection and location system 112 may generate a 3D model based on any number of the 2D images and/or depth data.

In step 302, the object identification module 214 may identify objects. In various embodiments, the object identification module 214 identifies objects based on 2D images and associated position information of the image capture device, depth data, and/or mesh data. These different processes are discussed herein. The object identification module 214 may identify objects captured in the 2D images and/or the 3D model.

In step 304, the tag module 216 may categorize and/or tag objects in the 3D model as object instances and/or by object type. In various embodiments, the object identification module 214 and/or the tag module 216 collects information regarding location of the object(s) identified by the object identification module 214 in the 3D model, number of object instances for one or more object types, and/or the like.

In step 306, the information collected or generated by the object identification module 214 and/or tag module 216 may be stored in the object datastore 220 for later retrieval to provide information relative to information requests (e.g., from users).

In step 308, the visualization module 218 provides a 3D model visualization to a digital device or enables a user to view and/or interact with the 3D model (e.g., as a walkthough of the virtual environment). The visualization may be interactive whereby the visualization includes a graphical user interface (GUI) to enable users to request information (e.g., through a query field) or interactive elements of the GUI.

In step 310, the visualization module 218 receives an information request from a user (e.g., or another digital device). The information request may be for a number or location of a particular object type within the 3D model.

In step 312, the visualization module 218 retrieves information (e.g., from the object datastore 220 and/or image datastore 222) to respond to the request.

In step 314, the visualization module 218 provides a response and/or visualization of objects in the 3D model in response to the request.

FIG. 4 is an example user interface 400 associated with a visualization. In FIG. 4, the user may interact with area 410 to view and navigate around that portion of the building. In this example, the user requests more information regarding the location of outlets in the 3D model by providing a query in a query field of the visualization (e.g., provided by the visualization module 218).

In response, the visualization module 218 may retrieve information regarding objects are of the requested object type ("outlets"), may provide a list 420 identifying the outlets and/or provide a view (e.g., dollhouse view) indicating the outlets in the image.

While outlets are used in the example of FIG. 4, it will be appreciated that the user may search for any object that has been identified and associated information stored by the object detection and location system 112.

By providing information regarding the 3D model and associated physical structure, the user may be able to more than "walk through" a 3D model. Rather, the user may interact with the visualization, identify key parts of the model of interest (e.g., number of bathrooms, locations of sinks, and the like) to ensure that the premises is suitable for the user's desired purpose.

By enabling automated object detection and object information collection, the object detection and location system 112 may provide an interactive visualization and previously unavailable analytical abilities to the user in a way that scales with any number of 3D models for any number of users or other digital devices. Further, by identifying objects and collecting information as discussed herein, errors are reduced, information is more readily available, and compute resources are greatly conserved over methods of manual data collection.

In some embodiments, the user may interact with a list 420, which provides multiple instances of objects in a given object type (i.e., a category of object).

Returning to the example of FIG. 4, the list 420 lists identified outlets located in the 3D model. The user may interact with one particular outlet, such as entry 422. In response, the user interface 400 may provide the location of the particular outlet in the floorplan of the building.

Figure 5:
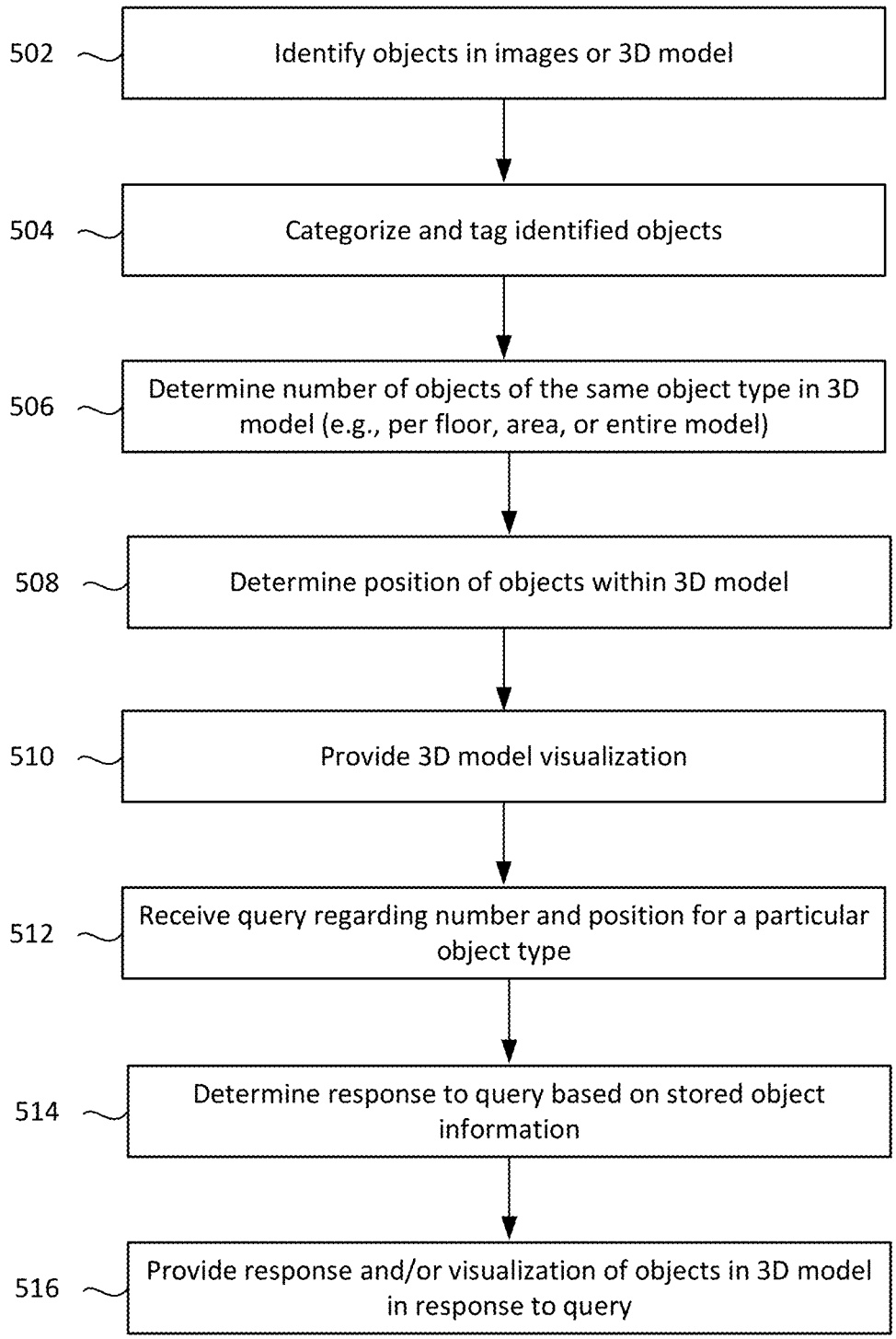
FIG. 5 depicts a flowchart of a multiple capture position approach to the object detection process according to some embodiments.

FIG. 5 depicts a flowchart of an object detection process 500 according to some embodiments. As discussed herein, in various embodiments, the communication module 204 receives multiple two-dimensional images and/or a three-dimensional model of the physical environment. In some embodiments, the communication module 204 receives from an image capture device 106 any number of two-dimensional images. The communication module 204 may receive, In some embodiments, depth information from the image capture device 106 or another device. In some embodiments, the object detection and location system 112 may generate a 3D model based on any number of the 2D images and/or depth data.

In step 502, the object identification module 214 may identify objects. In various embodiments, the object identification module 214 identifies objects based on 2D images and associated position information of the image capture device, depth data, and/or mesh data. These different processes are discussed herein. The object identification module 214 may identify objects captured in the 2D images and/or the 3D model.

In step 504, the tag module 216 may categorize and/or tag objects in the 3D model as object instances and/or by object type. In various embodiments, the object identification module 214 and/or the tag module 216 collects information regarding location of the object(s) identified by the object identification module 214 in the 3D model, number of object instances for one or more object types, and/or the like.

In step 506, the object identification module 214 may increment an object type count (e.g., an object type number) for each object instance of a particular object type. For example, the object identification module 214 may increment an outlet count (e.g., an "outlet" object type) for each outlet instance identified for a particular 3D model or physical environment by the object identification module 214.

In step 508, the object identification module 214 may collect information regarding the location of any number of object instances identified by the object instance module 214. For example, the object identification module 214 may identify a location of an object based on location of an image captured device that captured an image depicting the object, based on depth data, and/or based on a mesh of the 3D model. The location information may indicate a floor or portion of a 3D model where the object instance is located. In some embodiments, the location information indicates a location for a particular object instance in the 3D model.

The object identification module 214 may associate the object type count and/or location information with the object instance and store the information within the depth data module 210 to enable the visualization module 218 to respond to queries regarding object(s) of the 3D model.

In step 510, the visualization module 218 provides a 3D model visualization to a digital device or enables a user to view and/or interact with the 3D model (e.g., as a walkthough of the virtual environment). The visualization may be interactive whereby the visualization includes a graphical user interface (GUI) to enable users to request information (e.g., through a query field) or interactive elements of the GUI.

In step 512, the visualization module 218 receives a query from a user (e.g., or another digital device) over an API or field of the visualization. In this example, the user may provide a query regarding the number and position for a particular object type (e.g., fire extinguishers).

In step 514, the visualization module 218 retrieves information (e.g., from the object datastore 220 and/or image datastore 222) to respond to the request. In this example, the visualization module 218 identifies the object type of the request (i.e., fire extinguishers), and retrieves an object type count (e.g., a number of fire extinguishers) of the 3D model. It will be appreciated that the user may request the number of fire extinguishers per floor, in particular location of the 3D model and the like. In that example, the visualization module 218 may restrict the information request or filter the information request such that only the number of object instances that qualify for the query are retrieved. In one example, the visualization module 218 may identify the object instances that qualify for the object type identified in the query that are located at or within a specified location of the model, determine the total number of qualifying object instances, and return the number of qualifying object instances.

The query may further request locations of one or more fire extinguishers in all or part of the 3D model. The visualization module 218 may retrieve object information indicating a location of the objects of interest (i.e., the location of object instances that are associated with the object type of "fire extinguishers").

In step 516, the visualization module 218 may provide the retrieved information (e.g., the number of object instances of the desired object type) and the location of qualifying object instances. In some embodiments, the visualization module 218 may provide a list of locations of the objects of interests and/or indications of where the objects of interest are in the 3D model (e.g., in a dollhouse view whereby a user may have a perspective of a portion of the 3D model, one or more floors of the 3D model, or the entire 3D model).

Figure 6:
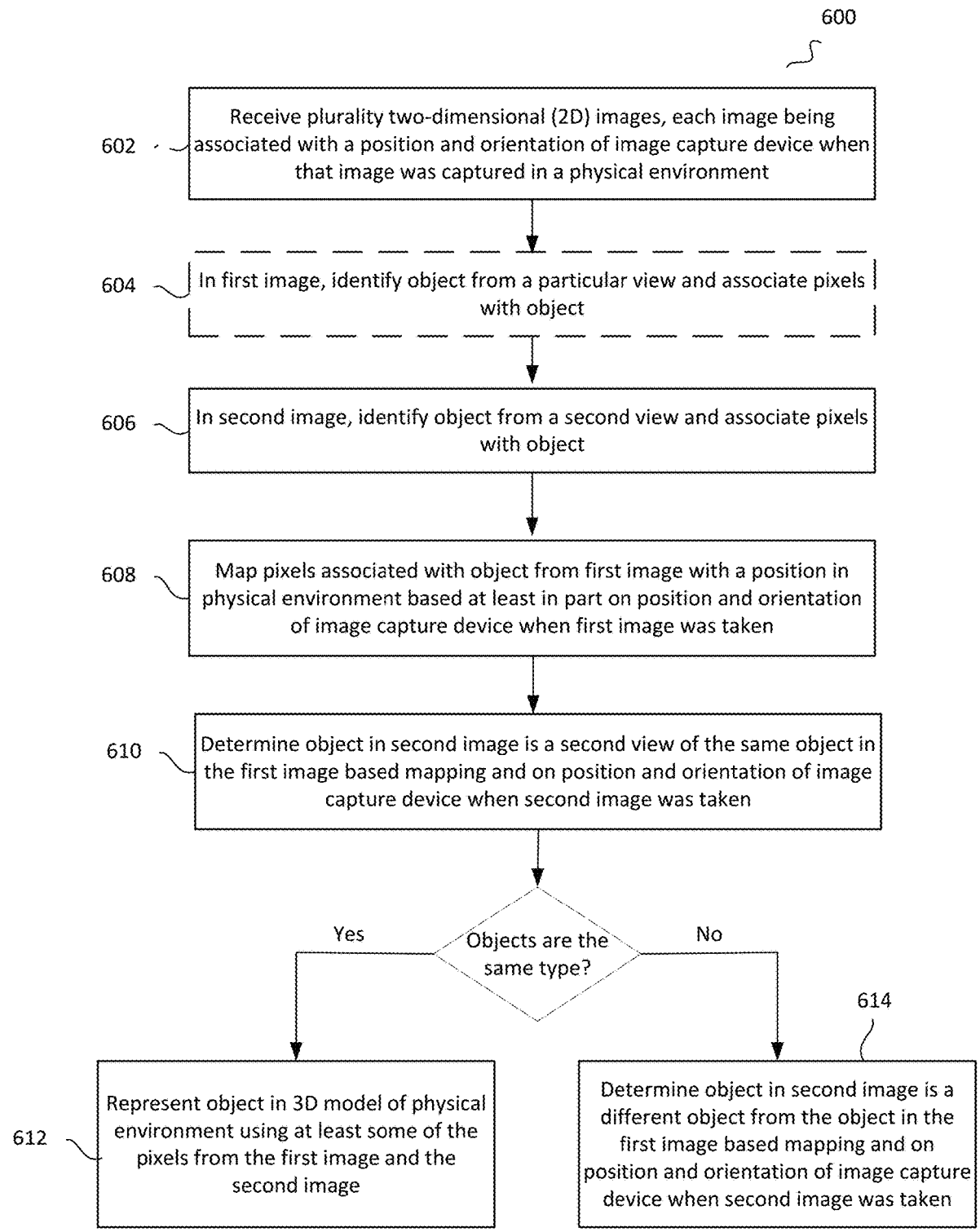
FIG. 6 is a flowchart for identifying the same or different object instances in two-dimensional images based on position of the image capture device that captured the images in some embodiments.

FIG. 6 is a flowchart for identifying the same or different object instances in two-dimensional images based on position of the image capture device that captured the images in some embodiments. While there may be many ways to determine if the object in multiple images is the same object (e.g., solely using depth data and position of the depth data in the 3D model), the process described in FIG. 6 may be scalable as the number of images and number of objects in the images increases.

If the same object is identified in multiple images, the depictions of the object in different images (e.g., different views) may be used in the 3D model. For example, a user may control a viewpoint in walkthrough of a 3D model. As the viewpoint changes, the view of the same object (e.g., the same chair) may change depending on the viewpoint. The image of the chair, including the different depictions in the 3D model may be generated in part based on the different viewpoint depictions of the object in the different images. By identifying the same object in the different images using the position and orientation of the camera, pixels and other information may be presented in the 3D model.

Further, by associated objects with the position and orientation of the image capture device, the objects may be differentiated from each other. For example, two objects captured in different images of the same physical environment may be similar to each other (i.e., they may be the same object type). Based on position of the image capture device, however, it may be determined that the two objects are different from each other (e.g., the depicted objects are both chairs but are on different floors) thereby allowing similar objects to be differentiated, allowing a count of that object type to increment, and metadata associated with the different objects (e.g., location relative to the 3D model and/or physical environment) stored.

In step 602, the communication module 204 receives a plurality of two-dimensional images of a physical environment (e.g., the interior of a facility, building, or residence). Each of the images may be associated with a position and/or orientation of the image capture device that captured the image.

In step 604, the object identification module 214 may recognize and/or identify a first object depicted in a particular image. The depicted first object may be from a particular view. The depicted view of the object in the particular image may be at a particular angle relative to the first object, may be partially obscured in the image, and/or the like. The first image may be associated with a position and/or orientation of the image capture device 106 that captured the image (i.e., when the image was captured by the image capture device 106).

In step 606, the object identification module 214 may recognize and/or identify a second object depicted in a particular image. The depicted second object may be from a particular view (e.g., a different view than that depicted in the first image). The depicted view of the second object in the particular image may be at a particular angle relative to the second object, may be partially obscured in the image, and/or the like. The second image may be associated with a position and/or orientation of the image capture device 106 that captured the image (i.e., when the second image was captured by the image capture device 106). The position of the image capture device 106 may be different from the position of the image capture device 106 when the first image was captured.

The location of the first object and the second object may be determined in any number of ways. In some embodiments, the location of the first object and the location of the second object may be determined using, at least in part, depth data (if available) from a depth data sensor (e.g., LiDAR). In various embodiments, the image capture device 106 includes both a camera and a LiDAR and is configured to take images and depth data (e.g., measurements using the LiDAR sensor) of the physical environment. The objects depicted in the image may be associated with the depth data to identify locations and/or if two more objects in two or more images depict the same object (e.g., by determining that the object in each of the images coincides with the same location defined by the depth data).

It will be appreciated that many objects may appear similar but are different instances of similar objects (e.g., there are two kitchen chairs that appear very similar or there are two electrical outlets that appear to be different designs based on the images). Similarly, some objects may appear to be the same (e.g., there are fire extinguishers on every floor that are the same model of fire extinguishers) but are different (which can be differentiated based on location).

It will be appreciated that any number of images may be taken by any number of image capture device(s) 106 (e.g., multiple images may be captured by repositioning the same image capture device 106 or using any number of image capture device 106 to capture any number of images from similar or different positions in the physical environment).

The object identification module 214 may identify objects in images in any number of ways. For example, the object identification module 214 may utilize a trained neural network (e.g., R-Mask CNN) to identify any number of objects (e.g., using instance segmentation). In some embodiments, the neural network produces a confidence score associated with the confidence that the object was identified and/or categorized. In various embodiments, the object identification module 214 may apply a confidence threshold to remove object identification(s) and/or classifications if the confidence score is insufficient relative to the confidence threshold.

In step 608, the object identification module 214 maps pixels (e.g., a portion of the image associated with the first object) to a position in the 3D model and/or physical environment based, at least in part, on the position and/or orientation of the image capture device 106 when the first image was captured.

In step 610, the object identification module 214 determines if the second object in the second image is a second view of the same object in the first image (e.g., the second object is a different view of the first object). In some embodiments, the object identification module 214 maps pixels (e.g., a portion of the image associated with the second object) to a position in the 3D model and/or physical environment based, at least in part, on the position and/or orientation of the image capture device 106 when the second image was captured. If the mapping coincide, then, if both the first object and the second object are of the same object type (e.g., they are both categorized as being part of the same object type), the object identification module 214 may conclude that the first and second objects in the different images depict the same object in the physical environment.

In various embodiments, rather than mapping the pixels or images of the second image, the object identification module 214 may utilize the position and/or orientation of the image capture device 106 when the second image was captured to determine if the first object and the second object coincide within the 3D model and/or physical environment.

If the object identification module 214 determines that the objects are the same, then in step 612 the 3D model may utilize pixels and/or portions of images of the different views of the same object within the 3D model (e.g., within a visualization of the 3D model) to enhance accuracy and realism of the depicted object in the 3D model. In various embodiments, the object identification module 214 may collect object information regarding the single object depicted in both images. For example, the object identification module 214 may store metadata associated with the object such as the object type, increment a number of that particular object type, and/or a location of the object. The object information (e.g., associated with the object) may be stored in the object datastore 220.

If the object identification module 214 determines that the first and the second object are different (e.g., they are in different positions in the physical environment), then in step 614, the object identification module 214 may collect separate object information for each object. In various embodiments, the object identification module 214 may collect object information regarding both objects (e.g., the first and second objects) depicted in different images. For example, the object identification module 214 may store metadata associated with both object such as the object type, increment a number for each object of that particular object type, and/or locations of the objects. The object information (e.g., associated with each object) may be stored in the object datastore 220.

In various embodiments, pixels within different views of the same object depicted in different images may assist in the visualization of the object within a 3D model. Further, by identifying objects within the images of a physical space, metadata associated with different objects (e.g., tagging, location, and/or the like) may be stored to enable querying of the 3D model and/or physical space.

The information associated with the different objects (e.g., position, number of the same type of objects, and the like) may be collected and stored. This may enable an interactive system whereby a user may query for a number of a particular objects in a 3D model (e.g., "what are the number of electrical outlets?") and/or a position of particular objects (e.g., "where are the fire extinguishers located?"). A system may retrieve answers from the collected information associated with the position and number of different objects/object types to provide a textual and/or visual answer.

Figure 7:
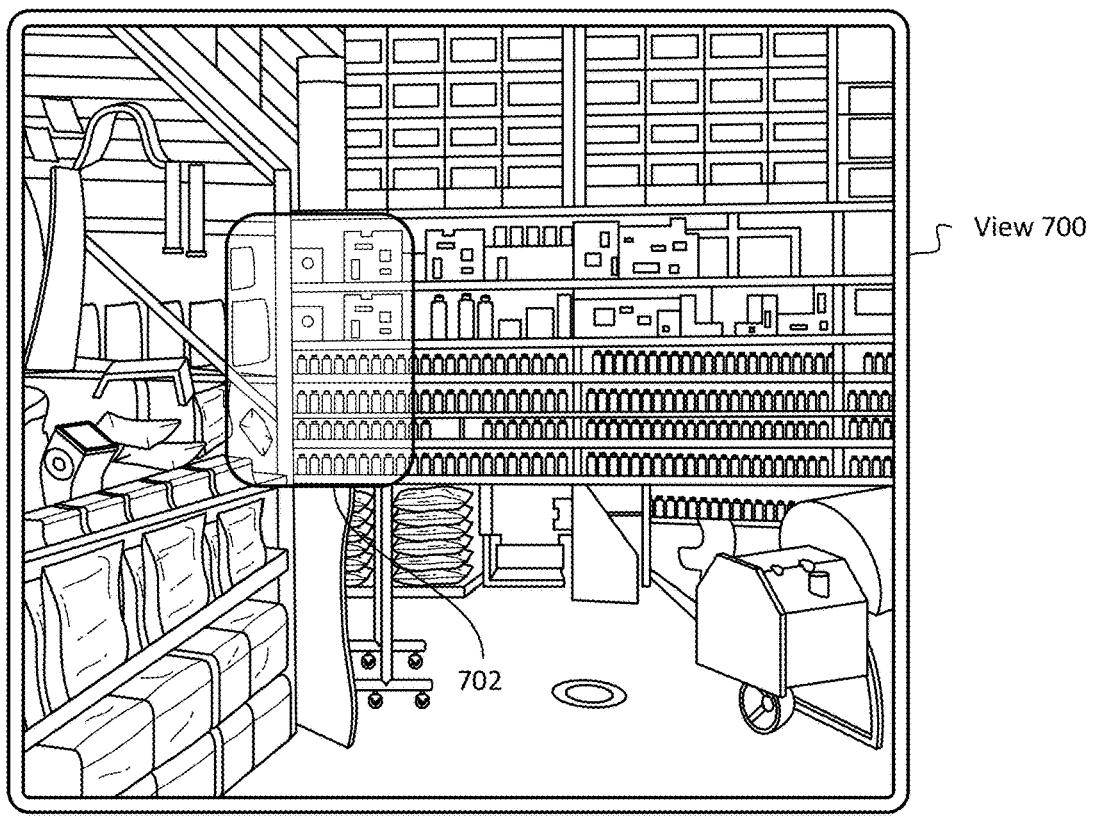
FIG. 7-10 depicts an example of an image collection of the same physical space as viewed by multiple image capture devices with two-dimensional object detections highlighted.

FIGS. 7-10 depict different images taken at different locations within a physical environment in an example. In the example of FIGS. 7-10, images are taken of a warehouse or retail store. FIG. 7 depicts a view 700 that includes, for example, a region that also appears in different angles and viewpoints from the other images in FIGS. 8-10. In FIG. 7, object 702 is partially visible.

Figure 8:
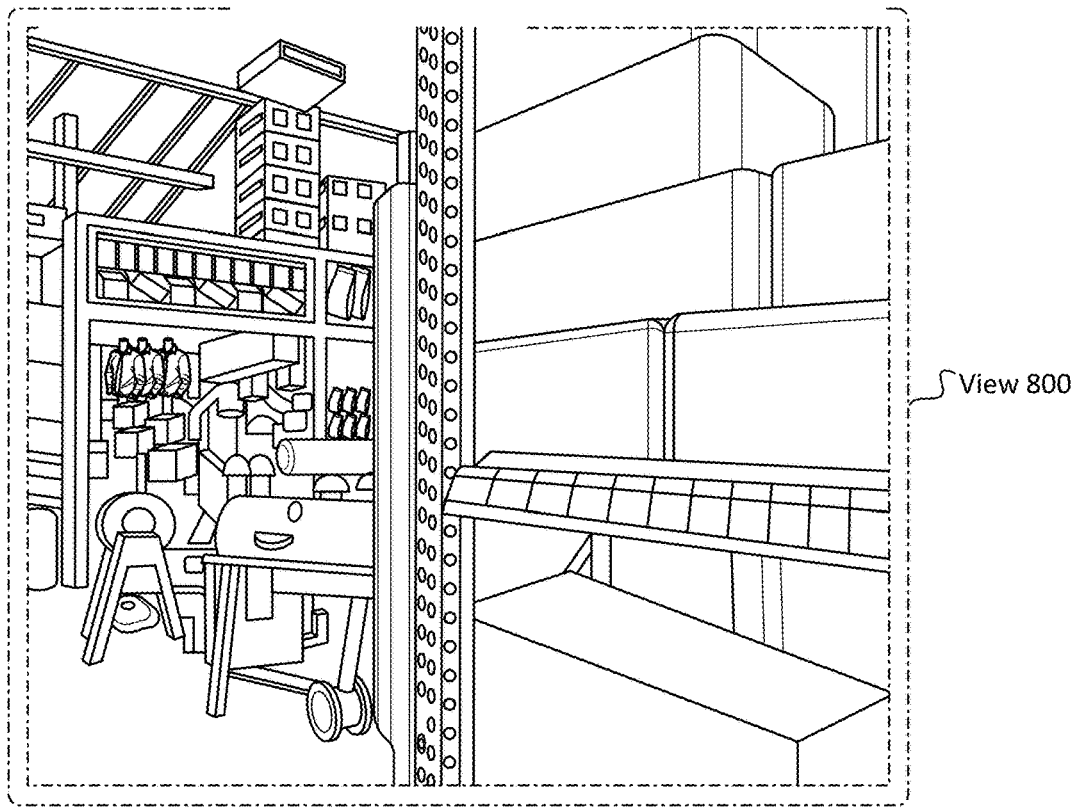

FIG. 8 depicts a view 800 within the same physical environment as that depicted in FIG. 7 but may or may not contain the same object.

Figure 9:

FIG. 9 depicts a view 900 within the same physical environment as that depicted in FIG. 7 but includes the object 902. Object 902 may be object 702. In various embodiments, the object identification module 214 may recognize the object using object recognition (e.g., using instance segmentation) in both images and may utilize orientation and/or position information of the image capture device 106 that captured the image to determine if the same object appears in both images.

Figure 10:
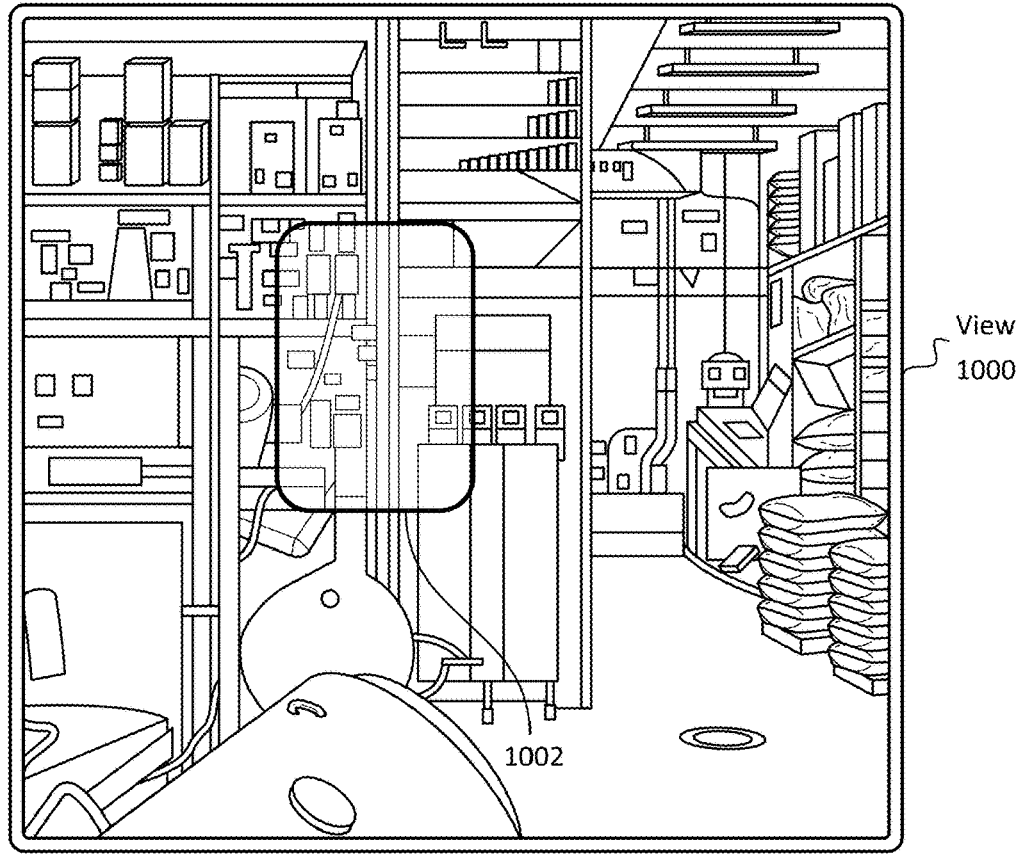

FIG. 10 depicts a view 1000 within the same physical environment as that depicted in FIGS. 7-9. Object 1002 identified in FIG. 10 may be object 702 and/or object 902. In one example, the object identification module 214 determines if the objects are the same object type and, if they are the same object type, the object identification module 214 may determine whether the objects are the same based on position and orientation of the capturing image capture device(s) 106. In various embodiments, the object identification module 214 may recognize the object using object recognition (e.g., using instance segmentation) in both images and may utilize orientation and/or position information of the image capture device 106 that captured the image to determine if the same object appears in any number of the images.

Figure 11:
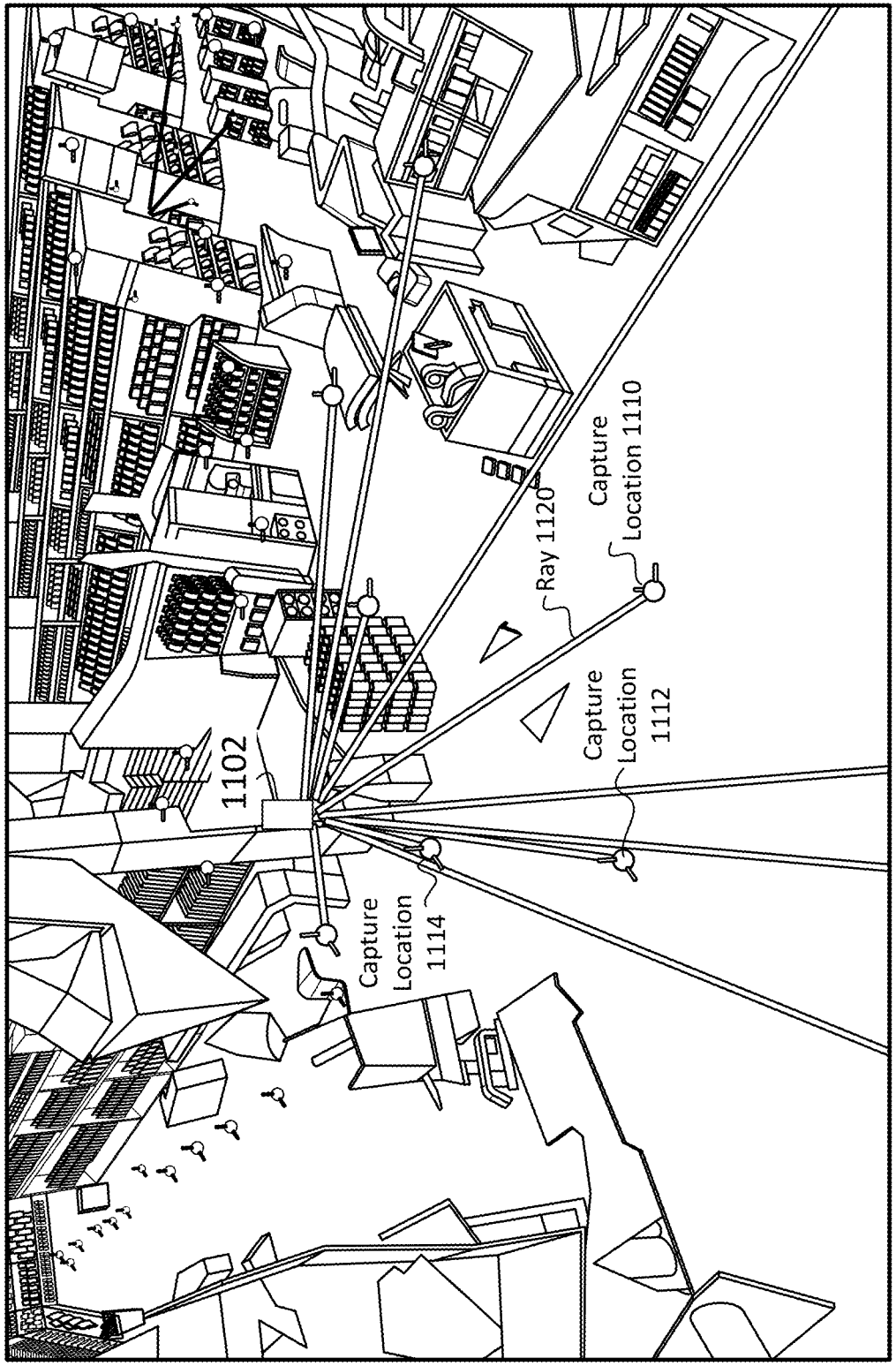
FIG. 11 depicts a merge of the image collection of FIG. 7-10 with showing the location of the image capture device and the location of the two-dimensional detected object.

FIG. 11 depicts a merge of the image collection of FIG. 7-10 with showing the location of the image capture device and the location of the two-dimensional detected object. In this example, the different capture locations 1110, 1112, 1114, and the like may be positions where images were taken that include object 1102. Each capture position 1110, 1112, and 1114 may be a position of the image capture device 106 that captured the image. In various embodiments, the orientation of the image capture device 106 when the image was captured is associated with the image as well.

For example, object 1102 may be the same object as objects 702, 902, and 1002. In this example, each of the different capture positions may be coincide with the capture position of one of the images of FIGS. 7, 9, and 10. Based on position and orientation of the image capture device 106 at the time the image was captured, the object may be triangulated to confirm or determine (e.g., at a reasonably likelihood) that the similar object in the different images are likely to be the same object (or alternatively likely to be different objects).

Figure 12:
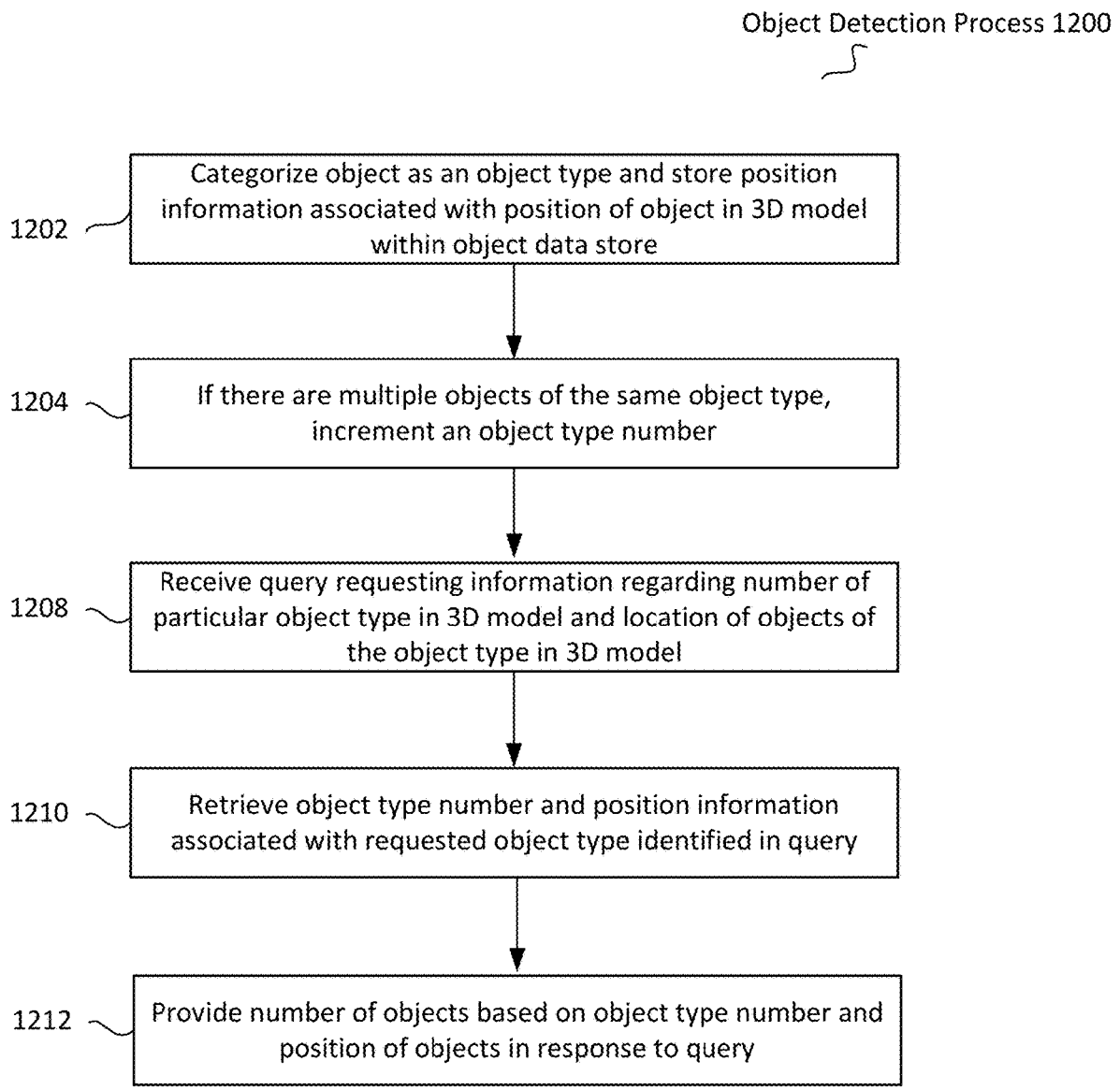
FIG. 12 depicts a flowchart for collecting information and providing interaction with a 3D model in some embodiments.

FIG. 12 depicts a flowchart for collecting information and providing interaction with a 3D model in some embodiments. In step 1202, the object identification module 214 categorizes or recognizes an object in one or more image. The object identification module 214 may categorize the object and/or save the object information (e.g., position of the object in the 3D model or the physical environment) in the image datastore 222.

In some embodiments, the object identification module 214 utilizes neural network to identify objects in the two-dimensional image (e.g., of a physical environment captured by a image capture device 106). It will be appreciated that one or more two-dimensional image may include one or more identified objects.

As discussed herein, the same identified objects may be identified in different two-dimensional images from different viewpoints. In some embodiments, the object identification module 214 may generate a bounding box that depicts a boundary or outer limits of a particular area of interest (e.g., that may contain an object to be identified or recognized).

Figure 14:
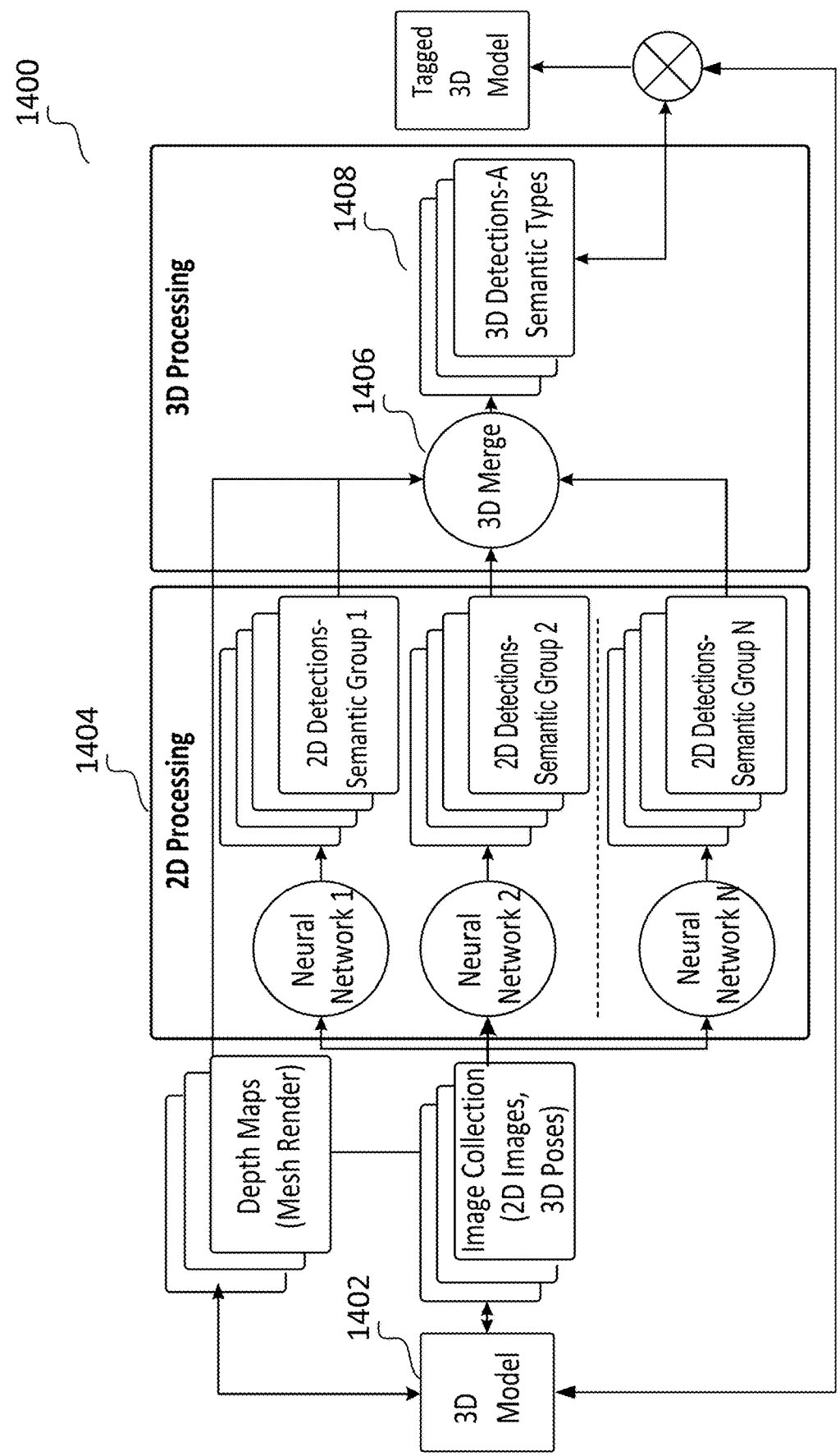
FIG. 14 depicts an overview of an implementation of the object detection and location system.

FIG. 14 depicts an overview a process 1400 of an implementation of the object detection and location system. Element 1402 is the 3D model and is both an output and may be an input in the process 1400. Element 1404 of process 1400 includes neural network 1, neural network 2, and neural network 3 (which may be differently trained neural networks) may perform 2D processing where different neural networks are trained to recognize different objects. Element 1406 may associate pixels of identified objects with a three-dimensional surface of the 3D model. Element 1408 may merge the detections and element 1408 may perform categorization of object type based on detection and semantics. The process 1400 may tag one or more recognized objects with a tag that is located within the visualization of the 3D model.

In some embodiments, the neural network may perform object recognition (e.g., using instance segmentation) to provide a probability that a particular object in an image belongs to a particular category (e.g., an object type).

For each object recognized by the neural network, the object identification module 214 may identify pixels in each of the subset of two-dimensional object detection associated with the particular object. These identified pixels may be known as object pixels. In addition to identifying the object pixels of one or more objects, the object identification module 214 may associate the object pixels with a surfel or surface element of the three-dimensional model of the physical environment.

For each object, the object identification module 214 may obtain a collection object data (e.g., location and/or orientation of the image capture device 106 that captured the image of the object, extrapolation of the position of the object relative to the one or more location and/or orientations, and/or the like). Determining the proximity of the subset of two-dimensional object detections to each other may provide a clearer indication of the probability that two or more recognized objects in different images is of the same object.

In some embodiments, the object identification module 214 may provide an cumulative confidence of the particular object identified in the collection of three-dimensional object detection based on the three-dimensional object probability. The cumulative confidence may be an aggregated, average, weighted averaged, etc. In various embodiments, the aggregated confidence may be calculated using the equation:

$$\text{confidence}_{combined} = 1 - \prod_{i=1}^{n}(1 - c_i)$$

where $c_i$ is the confidence reported for the i'th object detection of the collection of three-dimensional object detection for the particular object.

Figure 17A:
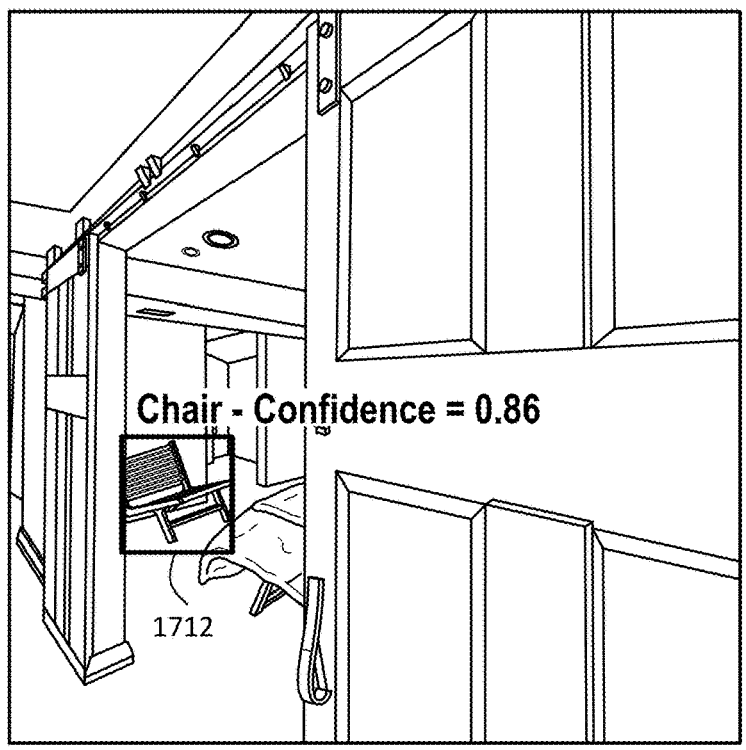
FIG. 17A-C depicts the locations of the same detected object from three different points of view according to some embodiments.
Figure 17B:
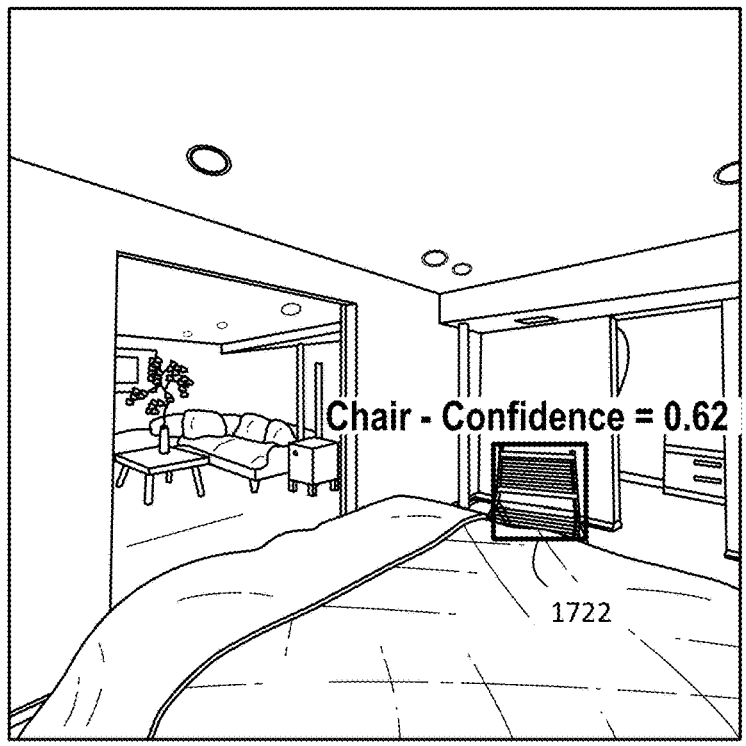
Figure 17C:
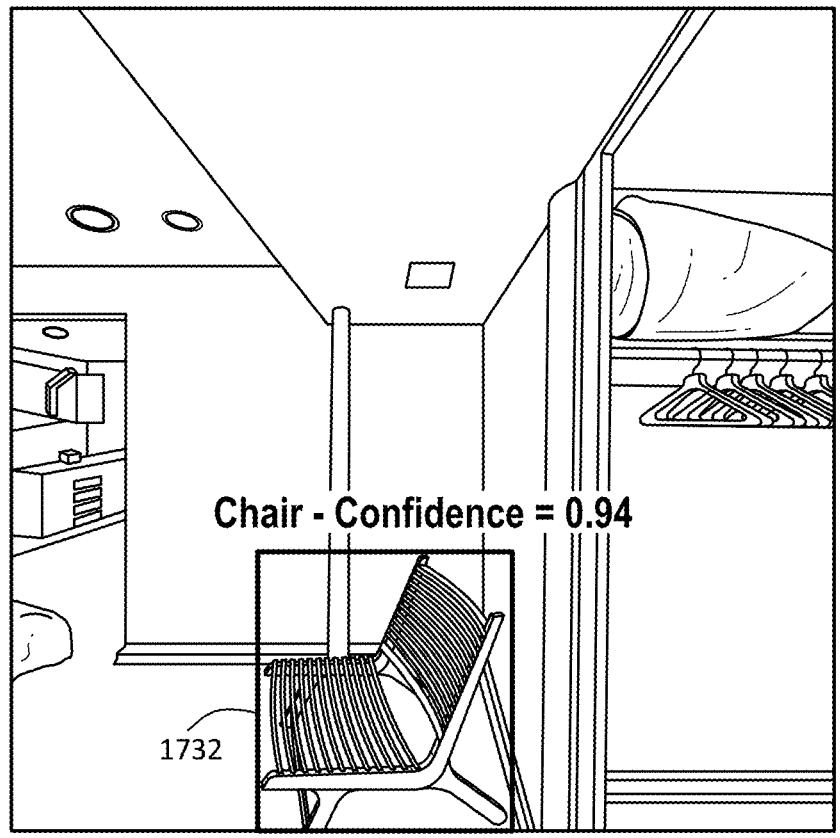

FIGS. 17A-C depict the same chair in different images as well as probability scores that the object is recognized. In the example of FIG. 17A through 17C, which provides a collection of three-dimensional object detections 1712, 1722, and 1732, each with a three-dimensional object probability of 0.86, 0.62, and 0.94, respectively. The aggregated confidence may be determined by:

$$\text{confidence}_{combined} = 1 - (1 - 0.86)(1 - 0.64)(1 - 0.94)$$
$$= 0.997$$

Once the object identification module 214 determines the cumulative confidence of the particular object, the object identification module 214 may send a request to the object datastore 220 to update or create an object instance entry for the particular object (e.g., that the objects are all the same object instance, that the object is a "chair" object type, and/or that the object instance is associated with a location in the 3D model and/or the physical environment). Furthermore, the object identification module 214 may send a request to the tag module 216 to define a tag and a particular point in the three-dimensional model to associate the tag.

Figure 20:
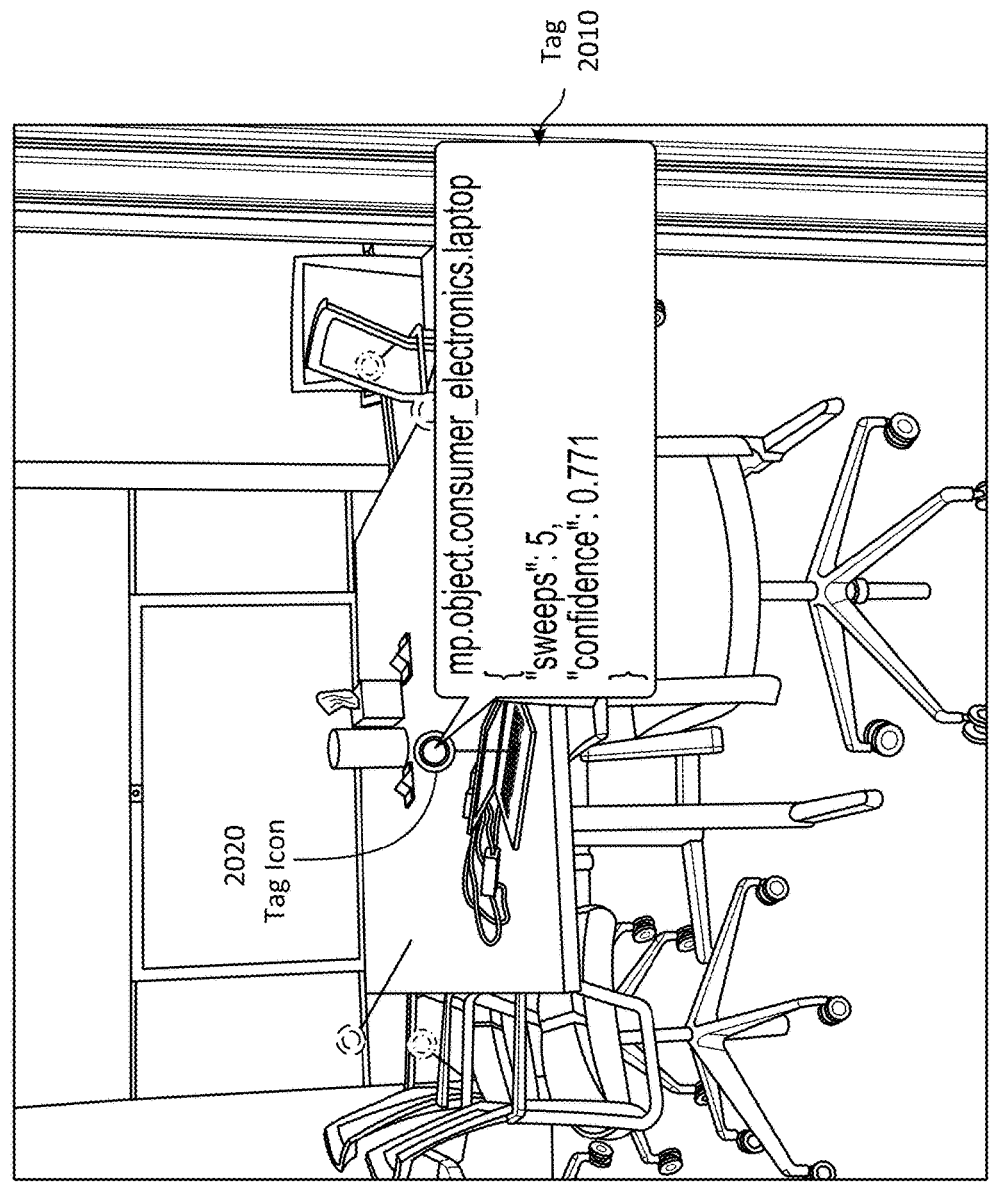
FIG. 20 is an example user interface showing an identified object by a tag corresponding to a three-dimensional point in a physical space according to some embodiments.

FIG. 20 depicts a user interface 2000 including a tag 2010, which provides a category for the particular object, and a tag icon 2020. The user may interact with the user interface 2000 in the area of the 1720 to receive more information about that particular object. It will be appreciated that the sweeps and confidence values may or may not be provided to the user in the user interface 2000.

In some embodiments, three-dimensional detections of the same object from two different views may be represented as two different sets of points (e.g., surfels) in the 3D model (e.g., detection surfaces, describable in the same coordinate system given prior knowledge of the relative positions of the image capture device which viewed and captured the images). As a result, the object detection and location system 112 may "merge" detection surfaces from different views (i.e., associate the union of these two sets of points with the same physical object) for depicting in the visualization of the 3D model.

An example of an approach for achieving this may assume that the surface of an object visible from one view (e.g., the front-top of a table) may either be close to or overlap with another surface of the same object visible from a different view (e.g., the back-top of the same table). The object identification module 214 may automatically determine that detections of these two surfaces representing the same object may leverage such assumptions to arrive at its determination. The object identification module 214 may consider, for example, the distance between the centroids of the two detection surfaces' points and the fact that they are near each other; or perhaps that each point in one of the detection surfaces has a sufficiently large number of points from the other detection surface located sufficiently near it.

FIG. 14 depicts an overview 1400 of an implementation of the object detection and location system. Element 1402 corresponds to step 302 of object detection process 300. Element 1404 of overview 1400, including Neural Network 1, Neural Network 2, and Neural Network 3 of overview 1400, and the multiple two-dimensional detections corresponding to their respective neural network correspond to step 306, where different Neural Networks are trained to recognize different objects. Element 1406, where pixels associated with each two-dimensional object detection with a three-dimensional surface of the model, may correspond to step 310. Element 1408 may correspond to step 312, where a collection of three-dimensional object detections are identified. Returning to step 1204 of FIG. 12, if there are multiple different objects (e.g., located in different positions relative to the physical environment and/or the 3D model) of the same object type (e.g., recognized as being the same category or same object type), then an object type number may increment for each different object of that object type to track a quantity of the object types. There may be different object type numbers of the same object type. For example, there may be an overall object type number to track the total number of objects of the same object type in the 3D model. There may also be an object type number for a portion of the 3D model (e.g., to track a count of different objects of the same type in a room, on a floor, and/or the like).

In step 1208, the visualization module 218 may provide an interface to allow users to interact with a 3D model. The visualization module 218 may receive a query from a user through the interface or may receive the query through a different means (e.g., through an API). The query may request information regarding one or more objects. For example, the query may request a number of a particular object type in the 3D model, location(s) of the objects of the same object type, and/or the like.

In step 1210, the visualization module 218 may retrieve the object type number from the object datastore 220 relative to the desired object type identified in the query as well as position information associated with the requested object type identified in the query (e.g., the number of electrical outlets and position of electrical outlets on a floor of the physical environment).

In step 1212, the visualization module 218 provides the response to the user. For example, the visualization module 218 may provide the object type number (e.g., number of electrical outlets) and the location and/or position of the object instances of the same object type identified in the query. In various embodiments, the visualization module 218 may provide the information by text (e.g., a list), indications within the 3D model, by graphic, by audio, by animation, and/or the like.

Figure 13:
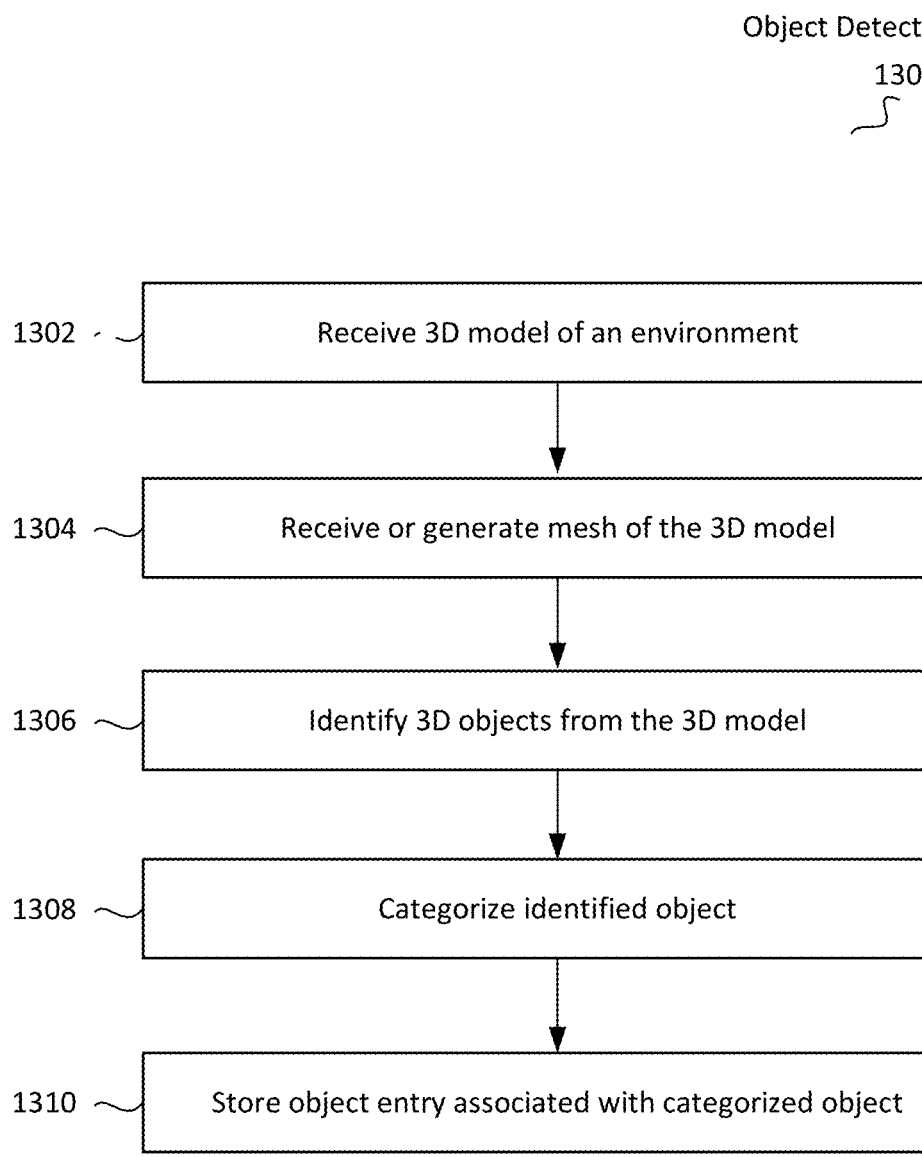
FIG. 13 depicts a flowchart of a mesh approach to the object detection process according to some embodiments.

FIG. 13 depicts a flowchart of an object detection process 1300 to the object detection process according to some embodiments. In step 1302, the communication module 204 receives a previously generated three-dimensional model of a physical environment. The three-dimensional model may be created by a third-party software application (not shown). The three-dimensional model may be generated based on two-dimensional images and depth data of the physical environment. In some embodiments, the three-dimensional model does not include a mesh.

In step 1304, the mesh building module 212 may generate a mesh of the physical environment. The mesh building module 212 may generate the mesh based on received depth data of the physical environment received from In some embodiments, the mesh building module 212 generates a triangular mesh, an example of this can be found in FIG.

Figure 15A:
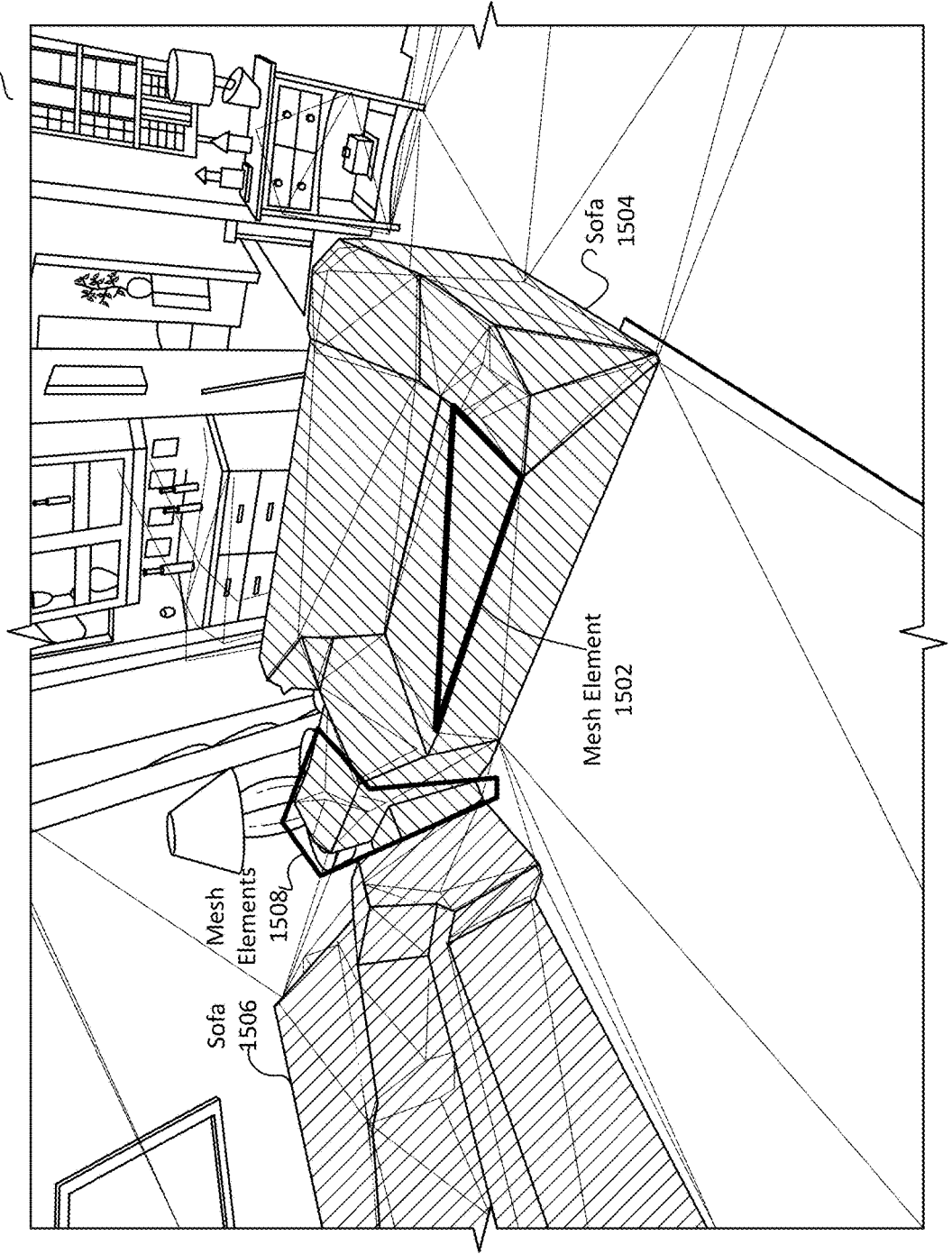
FIG. 15A depicts components of the mesh which make up objects in a physical environment according to some embodiments.

15A. FIG. 15A depicts an image of a physical environment overlaid with a triangular mesh. Pixels within the mesh element 1502 of FIG. 15A represents an area of the environment on a common physical plane.

In step 1306, object identification module 214 may identify objects within the three-dimensional model received in step 1302. In some embodiments, a machine learning algorithm is trained to identify three-dimensional objects and/or two-dimensional objects. The object identification module 214 using the trained machine learning algorithm (e.g., neural network and/or any other ML approach) may detect and identify three-dimensional objects based on the three-dimensional model and mesh received and/or generated in step 1304.

The object identification module 214 may both identify objects in the mesh (e.g., in step 1306) and categorize the objects using the machine learning algorithm (e.g., the neural network(s) discussed herein) in step 1308.

As discussed herein, the mesh may assist in defining location and distance within the 3D model. For example, a view 1500 of FIG. 15A depicts one view of the three-dimensional model, which includes the mesh element 1502. The object identification module 214 may identify two pieces of furniture, sofas 1504 and 1506. Each of the sofas 1504 may be depicted on the view 1500 as a series of triangles, including mesh element 1502 shaded in different colors.

The object identification module 214 identifies pixels of the three-dimensional model associated with the detected three-dimensional object. Once the object identification module 214 determines that the three-dimensional views in a collection of previously identified objects are of the same object, the object identification module 214 may refine the edges of the identified object. For example, the object identification module 214 may define a mesh surface of sofa 1504 including mesh elements 1508. The three-dimensional surface in the physical space, which corresponds to mesh elements 1508, is not part of sofa 1504. The edge or boundary of sofa 1504 may be further refined as the object identification module 214 views sofa 1504 from different views of the three-dimensional model.

Figure 15B:
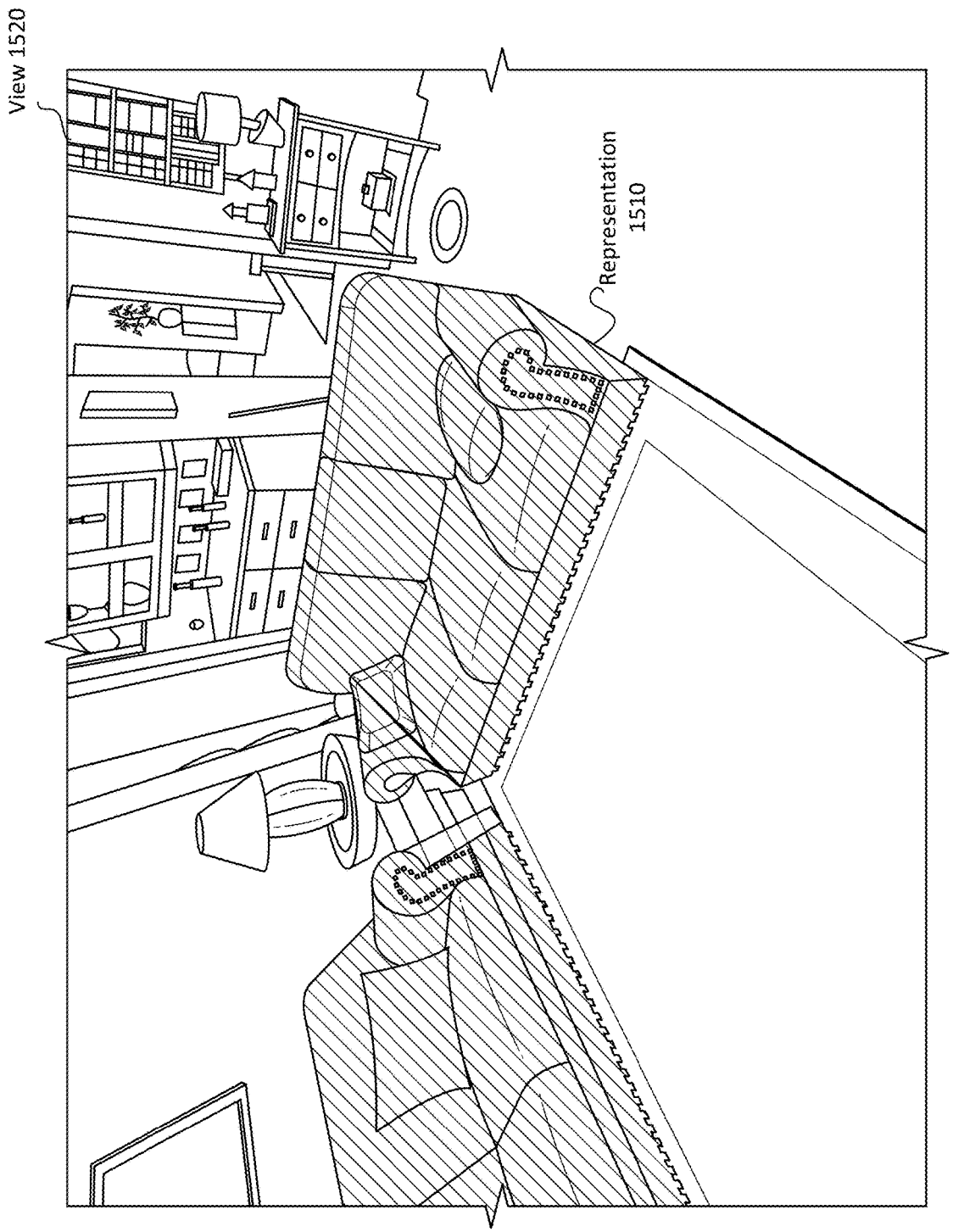
FIG. 15B depicts the location, size, and shape of two recognized objects in the physical environment according to some embodiments.

A view 1520 of FIG. 15B includes a representation 1510, a more refined edge of the identified sofa 1504 of FIG. 15A, which does not include the mesh elements 1508, as seen in FIG. 15A.

Figure 16B:
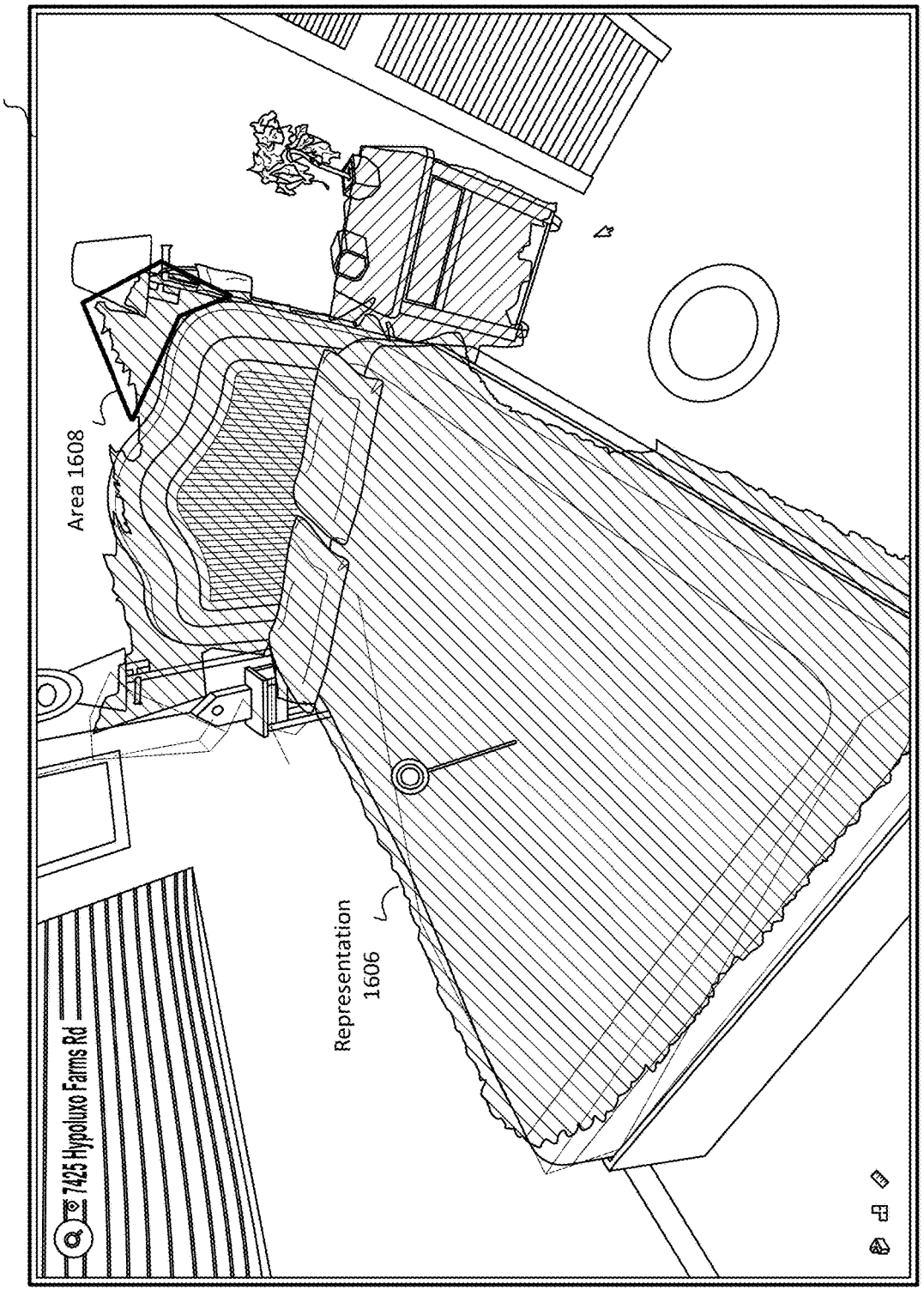
FIG. 16B depicts the location, size, and shape of identified objects in the physical environment, highlighted in different colors according to some embodiments.

Views 1600 and 1620 of FIGS. 16A and 16B, respectively, provide another example of objects identified by the object detection and location system 112. The object identification module 214 may identify a shape that represents an identified object, a bed 1602, which includes a mesh element 1604. In this example, a representation 1606 of bed 1602, identified in in FIG. 16A cover more than the actual physical space occupied by that particular piece of furniture. As seen in FIG. 16B, an area 1608 of the representation 1606 is not part of the bed, but the object identification module 214 identified this area as part of the same identified object. Fewer views of the three-dimensional model of the bedroom may result in the edge or boundary of the identified object is not aligned with reality. In some embodiments, the edges of the identified object may be manually corrected by a user of the object detection and location system 112.

The object identification module 214 may provide an cumulative confidence of the particular object identified in the collection of three-dimensional object detection based on the three-dimensional object probability.

In step 1310, the object identification module 214 may send a request to the object datastore 220 to update or create an object instance entry for the particular object. Furthermore, the object identification module 214 may send a request to the tag module 216 to define a tag and a particular point in the three-dimensional model to associate the tag.

Figure 18:
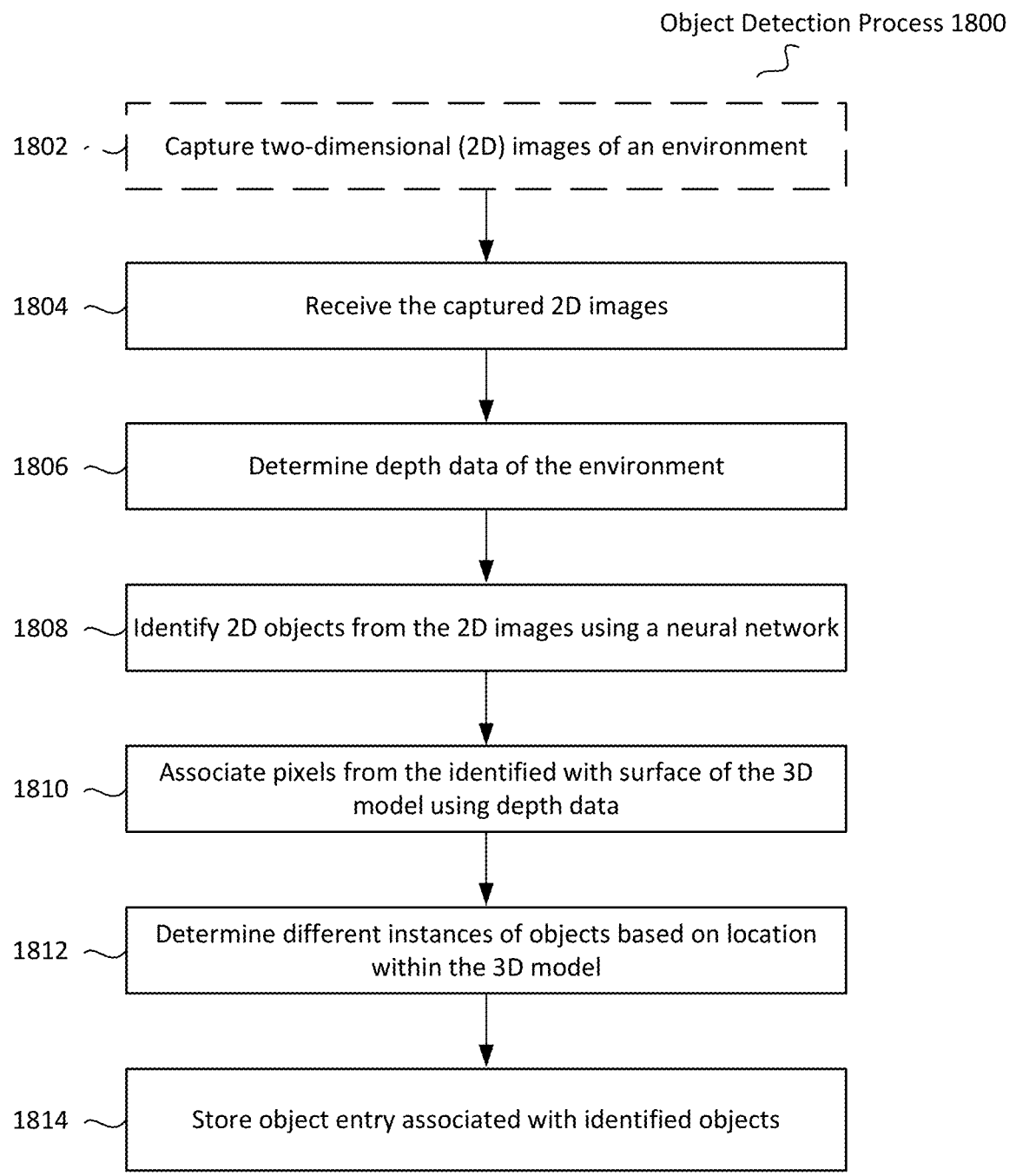
FIG. 18 depicts a flowchart of a depth estimate approach to the object detection process according to some embodiments.

FIG. 18 depicts a flowchart of object detection process 1800 according to some embodiments. In optional step 1802, the image capture device 106B may capture digital images of a building such as house 110. In step 1804, the communication module 204 may receive the captured two-dimensional images of house 110. An example of the two-dimensional image captured by the image capture devices 106B may be two-dimensional panoramic image 1900 of FIG. 19.

In this process, the communication module 204 receives two-dimensional images of a physical environment of the interior and/or exterior of the house 110. Before identifying objects depicted in the digital images of the house 110, the object detection and location system 112 may estimate depth data associated with the two-dimensional images. In step 1806, the depth data module 210 may determine depth data associated with two-dimensional images received by the communication module 204. The depth data module 210 may include a machine learning algorithm that estimates the depth data of the two-dimensional images based on characteristics such as color or light intensity to determine the distance between a spatial point depicted in a particular pixel of the image to the image capture device which captured the image. The estimated depth data may be used to generate a three-dimensional model of the physical environment. An example of a depth map of the physical environment may be seen in FIG. 19. A depth map 1910 maps each pixel to a measure of the distance from the optical center of the image capture device to the nearest physical surface intersected by a light ray that is traced from the camera's focal point through the given pixel.

In step 1808, the object identification module 214 utilizes Artificial Neural Network to identify objects in two-dimensional panoramic image. In some embodiments, the Artificial Neural Network to identify objects in two-dimensional images. One two-dimensional image may include one or more identified objects. The same identified objects may be identified in different two-dimensional images from different viewpoints. In some embodiments, the object identification module 214 may generate a bounding polygon that depicts a boundary or outer limits of the identified object. An example of a bounding polygon is the square depicting the boundary of a chair in the three-dimensional object detections 1722 of FIG. 17B. In some embodiments, the object identification module 214 identifies, for each identified object, a subset of two-dimensional images of the received two-dimensional images. Each image of the subset of two-dimensional images includes pixels that depict a particular object found in the physical environment. A particular object may be found in more than one two-dimensional image. Each two-dimensional image may include more than one object. Each two-dimensional object detection represents an instance of a physical object viewed by the image capture device. An example of a two-dimensional object detection is three-dimensional object detections 1712 of FIG. 17A which depicts a bounding box for an instance of an identified object, in this example, a chair.

In step 1810, the object identification module 214 may associate each pixel of the two-dimensional object detection with a surfel or surface of the three-dimensional model of the physical environment obtained by the estimated depth data from step 1806. In some embodiments, the object identification module 214 associated a cluster of pixels of the two-dimensional object detection with a surfel or surface of the three-dimensional model of the physical environment obtained by the estimated depth data from step 1806. The estimated depth data may be utilized to determine the location of a particular two-dimensional object in the three-dimensional model The object identification module 214 may identify unique objects in the three-dimensional model of the physical environment based on the location of the each two-dimensional object detection.

In step 1814, the object identification module 214 may provide an cumulative confidence of the particular object identified in the collection of three-dimensional object detection based on the three-dimensional object probability. The cumulative confidence may be an aggregated, average, weighted averaged, etc. The object identification module 214 may send a request to the object datastore 220 to update or create an object instance entry for the particular object. The object identification module 214 may send a request to the object datastore 220 to update or create an object type entry associated with the particular object type. Furthermore, the object identification module 214 may send a request to the tag module 216 to define a tag and a particular point in the three-dimensional model to associate the tag. An object instance entry may contain or indicate a particular instance of an object type. An object type entry may be associated with a particular object type. In some embodiments, the object datastore 220 may store an object type number indicating the total number of objects of that object type on a floor of the 3D model, portion of the 3D model, and/or entire 3D model. The object identification module 214 may increase an incremental count of the object type entry associated with dining room chair.

Figure 21:
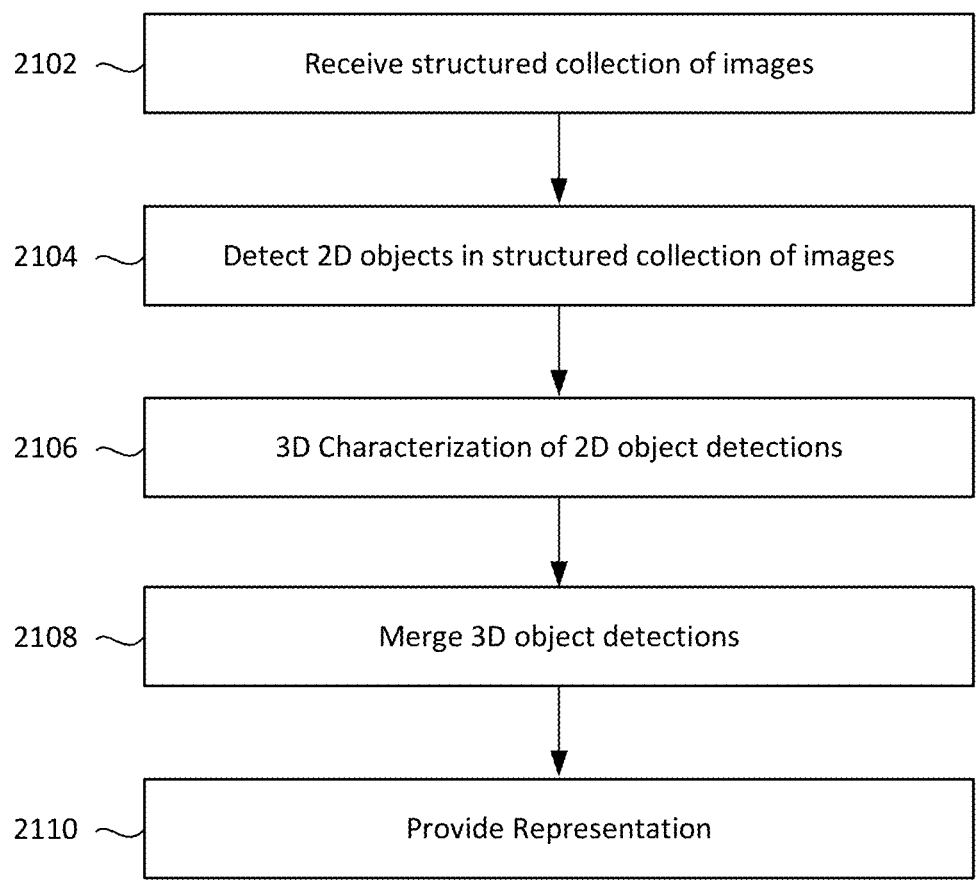
FIG. 21 depicts a flowchart of an object detection process according to some embodiment s.

FIG. 21 depicts a flowchart of object detection process 2100 according to some embodiments. In step 2102, the communication module 204 receives, from the image capture device 106A, a structured collection of images. The structured collection of images may be generated as a result of a capture process from Matterport's Pro3 camera. The structured collection of images generated by Matterport's capture process generates a depth map corresponding to each image in the collection of images. In some embodiments, the step 2102 includes color processing to reduce image artifacts. The structured collection of images may include panoramic two-dimensional images, three-dimensional panoramic images, and a depth map of the physical environment.

In step 2104, the object identification module 214 includes a Mask R-CNN to detect and identify two-dimensional objects in digital images. The object identification module 214 may further identify image pixels associated with the two-dimensional objects. These identified pixels may be known as object pixels. In some embodiments, the Mask R-CNN may provide a two-dimensional object probability that a particular object in each of the subset of two-dimensional object detections belong to a particular category.

An example of the Mask R-CNN can be found in https://arxiv.org/abs/1703.06870. The Mask R-CNN takes a color image as input and generates, for each object it detects in the image, a "mask" of pixels and a collection of classification "logits"—an estimate of the likelihood that the object belongs to each of a fixed set of semantic categories of objects that the network has been trained to detect. In some embodiments, the object identification module 214 may generate a bounding polygon that depicts a boundary or outer limits of the identified object.

In step 2106, for each two-dimensional object detected in step 2104, the object identification module 214 may associate the object pixels with a surfel or surface of the three-dimensional model of the physical environment to obtain three-dimensional object detections. The object identification module 214 may provide a three-dimensional object probability that a particular object in each of the subset of three-dimensional object detection belongs to a particular category.

In step 2108, object identification module 214, may merge three-dimensional object detections corresponding to the same object together. In some embodiments, the object identification module 214 may identify the three-dimensional object detections to merge based on spatial properties of each of the three-dimensional object detections, e.g., the location of each three-dimensional object detection in the three-dimensional model of the physical environment.

In addition to merging the three-dimensional object detections, the object identification module 214 may further provide an cumulative confidence of the particular object belonging to a particular object category based on the three-dimensional object probability of each three-dimensional object detection.

In step 2110, the object identification module 214 provides the cumulative confidence to a user interface. An example of this can be seen in FIG. 20. The user may interact with an example user interface 2000, which depicts an area of a physical environment along with an icon that depicts a location space where the object is located.

Figure 22:
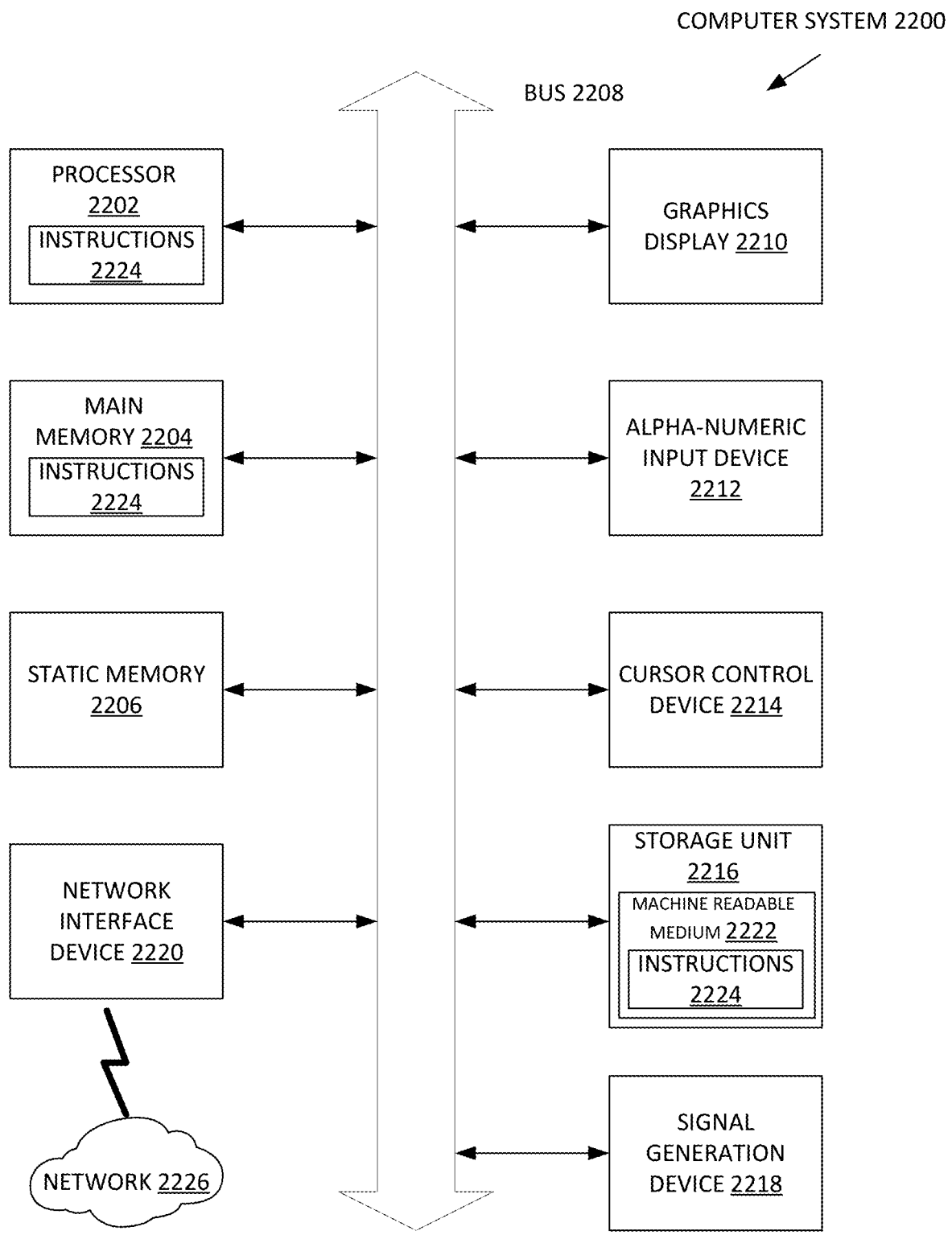
FIG. 22 depicts a block diagram of an example digital device according to some embodiments.

FIG. 22 is a block diagram illustrating entities of an example machine able to read instructions from a machine-readable medium and execute those instructions in a processor to perform the machine processing tasks discussed herein, such as the engine operations discussed above. Specifically, FIG. 22 shows a diagrammatic representation of a machine in the example form of a computer system 2200 within which instructions 2224 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2224 (sequential or otherwise) that specify actions to be taken by that machine. Further, while only a single machine is illustrated, the term "machine" shall also be taken to include any collection of machines that individually or jointly execute instructions 2224 to perform any one or more of the methodologies discussed herein.

The example computer system 2200 includes a processor 2202 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 2204, and a static memory 2206, which are configured to communicate with each other via a bus 2208. The computer system 2200 may further include a graphics display unit 2210 (e.g., a plasma display panel (PDP), a liquid crystal display (LCD), a projector, or a cathode ray tube (CRT)). The computer system 2200 may also include alphanumeric input device 2212 (e.g., a keyboard), a cursor control device 2214 (e.g., a mouse, a trackball, a joystick, a motion sensor, or other pointing instrument), a data store 2216, a signal generation device 2218 (e.g., a speaker), an audio input device 2226 (e.g., a microphone) and a network interface device 2220, which also are configured to communicate via the bus 2208.

The data store 2216 includes a machine-readable medium 2222 on which is stored instructions 2224 (e.g., software) embodying any one or more of the methodologies or functions described herein. The instructions 2224 (e.g., software) may also reside, completely or at least partially, within the main memory 2204 or within the processor 2202 (e.g., within a processor's cache memory) during execution thereof by the computer system 2200, the main memory 2204 and the processor 2202 also constituting machine-readable media. The instructions 2224 (e.g., software) may be transmitted or received over a network (not shown) via network interface 2220.

While machine-readable medium 2222 is shown in an example embodiment to be a single medium, the term "machine-readable medium" should be taken to include a single medium or multiple media (e.g., a centralized or distributed database, or associated caches and servers) able to store instructions (e.g., instructions 2224). The term "machine-readable medium" shall also be taken to include any medium that is capable of storing instructions (e.g., instructions 2224) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as any number of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 22. Alternatively, hardware or software modules may be stored elsewhere within a computing system.

As referenced herein, a computer or computing system includes hardware elements used for the operations described here regardless of specific reference in FIG. 22 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
one or more processors; and
memory containing instructions to control the one or more processors to:
receive a plurality of images representing an interior of a physical environment;
identify, using a neural network for object recognition, a first object in a first image of the plurality of images, the first object being associated with first object location information, the first object location information indicating a location relative to the physical environment;
identify, using the neural network for object recognition, a second object in a second image of the plurality of images;
determine if the first object in the first image and the second object in the second image are located near or at a similar location of the physical environment based on location information associated with the first image and second object location information associated with the second image;
if the first object and the second object are located near or at the similar location, then the first object and the second object are an instance of a single object;
store the similar location associated with the single object;
display an interactive walkthrough visualization of a three-dimensional (3D) model of the physical environment, the 3D model including the single object;
receive an object information request regarding object location through the interactive walkthrough visualization; and
provide the similar location of the single object for display in the interactive walkthrough visualization.

2. The system of claim 1, wherein the instructions further control the one or more processors to determine if the first object and the second object are of a same object type.

3. The system of claim 2, wherein the first object and the second object are the instance of the single object if the first object and the second object are located near or at a similar location and the first object is the same object type as the second object.

4. The system of claim 2, wherein identify the first object using the neural network for object recognition further comprises categorizing the first object using the neural network to identify an object type of the first object.

5. The system of claim 1, wherein the instructions further control the one or more processors to determine the first object location information and the second object location information based on a mesh of the 3D model.

6. The system of claim 1, wherein the first image includes position and orientation of an image capture device that captured the first image in the physical environment, the instructions further control the one or more processors to determine the first object location information based on the position and orientation of the image capture device that captured the first image.

7. The system of claim 6, wherein the second image includes position and orientation of an image capture device that captured the second image in the physical environment, the instructions further control the one or more processors to determine the second object location information based on the position and orientation of the image capture device that captured the second image.

8. The system of claim 1, wherein the first image is associated with depth data of the physical environment, the depth data being generated by a depth data device, the first object location being determined based on the first object depicted in the first image and associated relevant depth data.

9. The system of claim 8, wherein the depth data device is a LiDAR.

10. A non-transitory computer-readable medium comprising executable instructions, the executable instructions being executable by one or more processors to perform a method, the method comprising:
   receiving a plurality of images representing an interior of a physical environment;
   identifying, using a neural network for object recognition, a first object in a first image of the plurality of images, the first object being associated with first object location information, the first object location information indicating a location relative to the physical environment;
   identifying, using the neural network for object recognition, a second object in a second image of a plurality of images;
   determining if the first object in the first image and the second object in the second image are located near or at a similar location of the physical environment based on location information associated with the first image and second object location information associated with the second image;
   if the first object and the second object are located near or at the similar location, then the first object and the second object are an instance of a single object;
   storing the similar location associated with the single object;
   displaying an interactive walkthrough visualization of a three-dimensional (3D) model of the physical environment, the 3D model including the single object;
   receiving an object information request regarding object location through the interactive walkthrough visualization; and
   providing the similar location of the single object for display in the interactive walkthrough visualization.

11. The non-transitory computer-readable medium of claim 10, the executable instructions that are executable by the one or more processors to further:
   determining if the first object and the second object are of a same object type.

12. The non-transitory computer-readable medium of claim 11, wherein the first object and the second object are the instance of the single object if the first object and the second object are located near or at a similar location and the first object is the same object type as the second object.

13. The non-transitory computer-readable medium of claim 11, wherein identifying the first object using the neural network for object recognition further comprises categorizing the first object using the neural network to identify the object type of the first object.

14. The non-transitory computer-readable medium of claim 10, the executable instructions that are executable by the one or more processors to further:
   controlling the one or more processors to determine the first object location information and the second object location information based on a mesh of the 3D model.

15. The non-transitory computer-readable medium of claim 10, wherein the first image includes position and orientation of an image capture device that captured the first image in the physical environment, the executable instructions that are executable by the one or more processors to further controlling the one or more processors to determine the first object location information based on the position and orientation of the image capture device that captured the first image.

16. The non-transitory computer-readable medium of claim 15, wherein the second image includes position and orientation of an image capture device that captured the second image in the physical environment, the executable instructions that are executable by the one or more processors to further determining the second object location information based on the position and orientation of the image capture device that captured the second image.

17. The non-transitory computer-readable medium of claim 10, wherein the first image is associated with depth data of the physical environment, the depth data being generated by a depth data device, the first object location being determined based on the first object depicted in the first image and associated relevant depth data.

18. The non-transitory computer-readable medium of claim 17, wherein the depth data device is a LiDAR.

19. A method comprising:
   receiving a plurality of images representing an interior of a physical environment;
   identifying, using a neural network for object recognition, a first object in a first image of the plurality of images, the first object being associated with first object location information, the first object location information indicating a location relative to the physical environment;
   identifying, using the neural network for object recognition, a second object in a second image of a plurality of images;
   determining if the first object in the first image and the second object in the second image are located near or at a similar location of the physical environment based on location information associated with the first image and location information associated with the second image;
   if the first object and the second object are located near or at the similar location, then the first object and the second object are an instance of a single object;
   storing the similar location associated with the single object;
   displaying an interactive walkthrough visualization of a three-dimensional (3D) model of the physical environment, the 3D model including the single object;
   receiving an object information request regarding object location through the interactive walkthrough visualization; and
   providing the similar location of the single object for display in the interactive walkthrough visualization.

* * * * *